(12) United States Patent
Ishizaki et al.

(10) Patent No.: US 9,994,662 B2
(45) Date of Patent: Jun. 12, 2018

(54) TWO-PART CURABLE COMPOSITION

(71) Applicant: TOAGOSEI CO., LTD., Tokyo (JP)

(72) Inventors: Kenichi Ishizaki, Aichi (JP); Yushi Ando, Aichi (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days. days.

(21) Appl. No.: 15/533,942

(22) PCT Filed: Dec. 1, 2015

(86) PCT No.: PCT/JP2015/083732
§ 371 (c)(1),
(2) Date: Jun. 7, 2017

(87) PCT Pub. No.: WO2016/093112
PCT Pub. Date: Jun. 16, 2016

(65) Prior Publication Data
US 2017/0327616 A1 Nov. 16, 2017

(30) Foreign Application Priority Data
Dec. 12, 2014 (JP) .................................. 2014-252172

(51) Int. Cl.
*C08F 222/32* (2006.01)
*C08K 5/315* (2006.01)
*C08L 101/10* (2006.01)
*C08F 2/44* (2006.01)
*C09J 201/00* (2006.01)
*C08L 101/12* (2006.01)

(52) U.S. Cl.
CPC .............. *C08F 222/32* (2013.01); *C08F 2/44* (2013.01); *C08K 5/315* (2013.01); *C08L 101/10* (2013.01); *C08L 101/12* (2013.01); *C09J 201/00* (2013.01); *C08F 2222/328* (2013.01)

(58) Field of Classification Search
CPC ..................................................... C08F 222/32
See application file for complete search history.

(56) References Cited

U.S. PATENT DOCUMENTS

| | | | |
|---|---|---|---|
| 4,170,585 A | 10/1979 | Motegi et al. | |
| 4,386,193 A | 5/1983 | Reich et al. | |
| 4,424,327 A | 1/1984 | Reich et al. | |
| 4,695,615 A | 9/1987 | Leonard et al. | |
| 4,866,198 A | 9/1989 | Harris | |
| 5,312,864 A | 5/1994 | Wenz et al. | |
| 6,607,632 B1 | 8/2003 | McDonnell et al. | |
| 2013/0174981 A1* | 7/2013 | Kelly | C09J 4/00 156/329 |
| 2016/0200951 A1 | 7/2016 | Ishiazaki et al. | |

FOREIGN PATENT DOCUMENTS

| | | |
|---|---|---|
| EP | 0142327 A1 | 5/1985 |
| JP | S53-115751 A | 10/1978 |
| JP | S54-28342 A | 3/1979 |
| JP | S59-122541 A1 | 7/1984 |
| JP | S60-31556 A1 | 2/1985 |
| JP | S60-168775 A | 9/1985 |
| JP | S60-179482 A | 9/1985 |
| JP | S62-235379 A | 10/1987 |
| JP | S63-12677 A | 1/1988 |
| JP | S63-88152 A | 4/1988 |
| JP | S63-112642 A1 | 5/1988 |
| JP | S63-128088 A | 5/1988 |
| JP | S58-8771 A | 1/1989 |
| JP | H2-34678 A | 2/1990 |
| JP | H3-167279 A | 7/1991 |
| JP | H3-265676 A | 11/1991 |
| JP | H5-505835 A | 8/1993 |
| JP | H6-57214 A | 3/1994 |
| JP | H6-172631 A1 | 6/1994 |
| JP | H6-240209 A | 8/1994 |
| JP | H8-505383 A | 6/1996 |
| JP | 2000-169544 A | 6/2000 |
| JP | 2000-191600 A | 7/2000 |
| JP | 2001-505235 A | 4/2001 |
| JP | 2005-350514 A | 12/2005 |
| JP | 2011-57733 A | 3/2011 |
| JP | 2014-515775 A | 7/2014 |
| WO | 9415590 A1 | 7/1994 |
| WO | 9415907 A1 | 7/1994 |
| WO | 2007023669 A1 | 3/2007 |
| WO | 2012/035112 A1 | 3/2012 |
| WO | 2013/111036 A1 | 8/2013 |
| WO | 2015/033738 A1 | 3/2015 |

OTHER PUBLICATIONS

International Search Report for PCT/JP2015/083732 dated Feb. 16, 2016; English translation submitted herewith (5 pages).
International Preliminary Examination Report for PCT/JP2015/083732 dated Feb. 16, 2016 (4 pages).
Hiroyuki Ohno et al., "Room Temperature Ionic Liquids from 20 Natural Amino Acids," J. Am. Chem. Soc., 2005, vol. 127, pp. 2398-2399.

* cited by examiner

*Primary Examiner* — Daniel H Lee
(74) *Attorney, Agent, or Firm* — Fitch, Even, Tabin & Flannery LLP

(57) ABSTRACT

The two-part curable composition has excellent curability, and exhibits flexibility and adhesion durability. The two-part curable composition includes a first reagent containing at least a 2-cyanoacrylic acid ester and a second reagent containing at least a polymer having a hydrolyzable silyl group, in which an elastomer and a curing catalyst for the above polymer are each contained in at least one of the first and second reagents in predetermined amounts. A preferable curing catalyst is a compound having a metal element and an organic group bonded to the metal element via oxygen, or an acid having a pKa of 4 or lower at 25° C. Preferably, a curing accelerator for 2-cyanoacrylic acid ester is contained in at least one of the first and second reagents.

16 Claims, No Drawings

TWO-PART CURABLE COMPOSITION

CROSS-REFERENCE TO RELATED APPLICATIONS

This application is a U.S. national phase application filed under 35 U.S.C. § 371 of International Application No. PCT/JP2015/083732, filed Dec. 1, 2015, designating the United States, which claims priority from Japanese Patent Application No. 2014-252172, filed Dec. 12, 2014, and the complete disclosures of which applications are hereby incorporated herein by reference in their entirety for all purposes.

TECHNICAL FIELD

The present invention relates to a two-part curable composition, and more specifically a two-part curable composition comprising a first reagent containing at least a 2-cyanoacrylic acid ester and a second reagent containing at least a polymer having a hydrolyzable silyl group.

BACKGROUND ART

A curable composition containing a 2-cyanoacrylic acid ester quickly establishes a strong bonding among various types of materials attributed to the unique anion polymerization characteristics exhibited by its principal component, 2-cyanoacrylic acid ester, which initiates polymerization under the presence of weak anion provided by slight moisture or the like attached to a surface of an adherend. Accordingly, it is used as the so-called instantaneous adhesive in a wide range of fields including industrial, medical, and household applications. Because the cured product thereof generally has no flexibility and is hard and brittle, there is a problem of impairing flexibility of adherends in case of bonding flexible adherends. Furthermore, the curable composition exhibits excellent shear adhesion strength; however, it is problematic in that peel adhesion strength and impact adhesion strength are low, and particularly cold/hot cycle resistance is inferior, particularly when it is applied between different types of adherends.

To overcome these problems, modification methods have been proposed heretofore, which include adding various types of plasticizers, elastomers and poorly-soluble rubber particulates (see, for instance, Patent Documents 1, 2 and 3).

Also proposed are an adhesion method that improves adhesiveness and a two-part curable composition. For example, Patent Document 4 discloses an adhesion method using two types of adhesives, i.e., (A) 2-cyanoacrylic acid ester and (B) an adhesive that is moisture-curable at ordinary temperature and is composed mainly of a polyisocyanate compound or an organic silicone compound having a hydrolyzable sily group, whereby temporary fixation is quickly achieved by the 2-cyanoacrylic acid ester, and sufficient peel adhesion strength and impact adhesion strength are exhibited after certain lapse of time. Further, Patent Document 5 discloses a two-part curable composition comprising a first reagent containing a 2-cyanoacrylic acid ester and a cation polymerization catalyst and a second reagent containing a cation curable component. Patent Document 6 discloses a two-part curable composition comprising a first reagent containing a 2-cyanoacrylic acid ester and a peroxide and a second reagent containing a radical-curable monomer and a transition metal.

On the other hand, also known in the art is a method for improving water-resistance of the curable composition by blending a monosilane compound or a bissilane compound in the 2-cyanoacrylic acid ester (e.g., Patent Document 7).

CONVENTIONAL TECHNICAL DOCUMENTS

Patent Documents

Patent Document 1: Japanese Patent Publication (Laid-open) No. H2-34678.
Patent Document 2: Japanese Patent Publication (Laid-open) No. H6-57214.
Patent Document 3: Japanese Patent Publication (Laid-open) No. H6-240209.
Patent Document 4: Japanese Patent Publication (Laid-open) No. S63-12677.
Patent Document 5: International Publication No. WO2012/035112
Patent Document 6: International Publication No. WO2013/111036
Patent Document 7: US Patent Publication 2013/0174981 specification.

SUMMARY OF INVENTION

Problems to be Solved by the Invention

Although the modification method disclosed in the aforementioned Patent Document 1 imparts flexibility to the composition, it is still unsatisfactory in that the cold/hot cycle resistance is not sufficiently improved particularly between different types of adherends, and that the adhesion strength decreases with lapse of time due to the bleeding out of the plasticizer from the cured body. Further, the adhesive compositions described in Patent Documents 2 and 3 are sometimes effective in improving the adhesion strength, but cured product is hard and the lack of flexibility still remains as a problem. Furthermore, the adhesion method disclosed in Patent Document 4 is problematic in that the entire cured product of the adhesive is insufficient in flexibility because the two-part liquids need to be applied separately to avoid mixing thereof. Although the two-part curable compositions disclosed in Patent Documents 5 and 6 are improved in tensile adhesion strength and shear adhesion strength, they cannot be improved in peel adhesion strength but give cured products which are still hard. On the other hand, the adhesive composition disclosed in Patent Document 7 contains a silane compound, but imparts no flexibility to the cured product because the silane compound is a low-molecular weight compound.

The present invention has been made in light of the above described circumstances, and the objective thereof is to provide a two-part curable composition which has excellent curability and exhibits flexibility and adhesion durability.

Means for Solving the Problems

The present inventors have made diligent studies for solving the aforementioned problems, and as a result, have found that a two-part curable composition comprising a first reagent containing at least a 2-cyanoacrylic acid ester and a second reagent containing at least a polymer having a hydrolyzable silyl group possesses curability, flexibility and adhesion durability in combination when specific amounts of an eleastomer and a curing catalyst for the above polymer are contained in at least one of the first reagent and the second reagent. Thus, the present invention has been accomplished.

That is, the present invention according to one aspect thereof provides a two-part curable composition comprising a first reagent containing at least a component (a) shown below and a second reagent containing at least a component (c) shown below, in which components (b) and (d) shown below are each contained in at least one of the first and second reagents, the contents of the component (b) contained in the first and second reagents being 5-50 parts by mass relative to 100 parts of the component (a) in terms of the component (b) contained in the first reagent and being 5-50 parts by mass relative to 100 parts by mass of the component (c) in terms of the component (b) contained in the second reagent, and the total amount of the component (d) contained in the first and second reagents being 0.0005-10 parts by mass relative to 100 parts by mass of the component (c), Component (a): a 2-cyanoacrylic acid ester;
Component (b): an elastomer;
Component (c): a polymer having a hydrolyzable silyl group; and
Component (d): a curing catalyst for the polymer (c).

According to the preferable embodiment of the present invention, the elastomer is a copolymer made from a monomer capable of forming a polymer poorly soluble to 2-cyanoacrylic acid ester and a monomer capable of forming a polymer soluble to 2-cyanoacrylic acid ester.

According to another preferable embodiment of the present invention, the elastomer is a copolymer made from a monomer capable of forming a polymer poorly soluble to 2-cyanoacrylic acid ester, a monomer capable of forming a polymer soluble to 2-cyanoacrylic acid ester, and a monomer containing a carboxyl group.

According to still another embodiment of the present invention, the monomer capable of forming a polymer poorly soluble to 2-cyanoacrylic acid ester is at least one selected from ethylene, propylene, isoprene, butadiene, chloroprene, 1-hexene and cyclopentene, and the monomer capable of forming a polymer soluble to 2-cyanoacrylic acid ester is at least one selected from acrylic acid esters, methacrylic acid esters, vinylchloride, vinylacetate, vinylether, styrene and acrylonitrile.

According to still another embodiment of the present invention, the main chain chemical structure of the polymer having a hydrolyzable silyl group is at least one selected from the group consisting of oxyalkylene polymer, vinyl polymer, polyester polymer, polyurethane polymer, and polycarbonate polymer.

According to still another embodiment of the present invention, the polymer having a hydrolyzable silyl group has a number average molecular weight of from 500 to 50,000

According to still another embodiment of the present invention, the curing catalyst is a compound having a metal element and an organic group bonded to the metal element via oxygen, or an acid having a pKa of 4 or lower at 25° C.

According to still another embodiment of the present invention, the metal element of the curing catalyst is at least one selected from the group consisting of titanium, zirconium, hafnium, tin, aluminium and zinc.

According to still another embodiment of the present invention, the organic group of the curing catalyst is at least one selected from the group consisting of alkoxy group, acetylacetone, acetoacetic esters, carboxyl group, and phenoxy group.

According to still another embodiment of the present invention, the acid is at least one selected from the group consisting of sulfonic acid, phosphoric acid, phosphoric acid monoesters, phosphoric acid diesters, phosphorous acid, and phosphorous acid esters.

According to still another embodiment of the present invention, the two-part curable composition further contains a curing accelerator for 2-cyanoacrylic acid ester in at least one of the first and second reagents.

According to still another embodiment of the present invention, the curing accelerator is an onium salt represented by the following general formula (1):

$$C^+A^- \qquad (1)$$

wherein $C^+$ is an onium cation, and $A^-$ is one selected from the anion group consisting of the followings:

a hydrogen sulfate anion, a hydrogen sulfite anion, a sulfonate anion represented by $R^1SO_3^-$ wherein $R^1$ is a group selected from the group consisting of an alkyl group, cycloalkyl group, vinyl group, aryl group, alkenyl group, alkynyl group and aralkyl group, or a halogen atom, and the aforementioned group may be substituted with a substituent, a sulfate anion represented by $R^2OSO_3^-$ wherein $R^2$ is a group selected from the group consisting of an alkyl group, cycloalkyl group, vinyl group, aryl group, alkenyl group, alkynyl group and aralkyl group, and the aforementioned group may be substituted with a substituent, a bis(substituted sulfonyl)imide anion represented by $(R^3SO_2)(R^4SO_2)N^-$ wherein $R^3$ and $R^4$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, an imide anion represented by $(R^5CO)(R^6CO)N^-$ wherein $R^5$ and $R^6$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, an sulfonylimide anion represented by $(R^7SO_2)(R^8CO)N^-$ wherein $R^7$ and $R^8$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, a perhalogenated lewis acid anion, a tetrafluoroborate anion, a hexafluorophosphate anion, a halogen anion, a nitrate anion, $CN^-$, $SCN^-$, $OCN^-$, $N(CN)_2^-$, a phosphoric acid anion and a phosphate anion represented by $(R^9O)_aPO_{4-a}^{(3-a)-}$ wherein $R^9$ is a group selected from the group consisting of an alkyl group, cycloalkyl group, vinyl group, aryl group, alkenyl group, alkynyl group and aralkyl group wherein the aforementioned group may be substituted with a substituent, a is an integer of 0-2, and $R^9$ may be the same or different in case there are a plurality of $R^9$, a phosphonic acid anion and a phosphonate anion represented by $R^{10}(R^{11}O)_bPO_{3-b}^{(2-b)-}$ wherein $R^{10}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{11}$ is a group selected from the group consisting of an alkyl group, cycloalkyl group, vinyl group, aryl group, alkenyl group, alkynyl group and aralkyl group wherein the aforementioned group may be substituted with a substituent, and b is 0 or 1, a phosphinic acid anion represented by $R^{12}{}_2PO_2{}^-$ wherein $R^{12}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{12}$ may be the same or different, a phosphorous acid and a phosphite anion represented by $(R^{13}O)_cPO_{3-c}{}^{(3-c)-}$ wherein $R^{13}$ is a group selected from the group consisting of an alkyl group, cycloalkyl group, vinyl group, aryl group, alkenyl group, alkynyl group and aralkyl group wherein the aforementioned group may be substituted with a substituent, c is an integer of 0-2, and $R^{13}$ may be the same or different in case there are a plurality of $R^{13}$, a phosphonous acid anion and a phosphonite anion represented by $R^{14}(R^{15}O)_dPO_{2-d}{}^{(2-d)-}$ wherein $R^{14}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{15}$ is a group selected from the group consisting of an alkyl group, cycloalkyl group, vinyl group, aryl group, alkenyl group, alkynyl group and aralkyl group wherein the aforementioned group may be substituted with a substituent, and d is 0 or 1, a phosphinic acid anion represented by $R^{16}{}_2PO^-$ wherein $R^{16}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{16}$ may be the same or different, a carboxylic acid anion represented by $R^{17}CO_2{}^-$ wherein $R^{17}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, a carbonate anion represented by $CO_3{}^{2-}$, a boric acid and a borate anion represented by $(R^{18}O)_fBO_{3-f}{}^{(3-f)-}$ wherein $R^{18}$ is a group selected from the group consisting of an alkyl group, cycloalkyl group, vinyl group, aryl group, alkenyl group, alkynyl group and aralkyl group wherein the aforementioned group may be substituted with a substituent, f is an integer of 0-2, and $R^{18}$ may be the same or different in case there are a plurality of $R^{18}$, a boronic acid and a boronate anion represented by $R^{19}(R^{20}O)_gBO_{2-g}{}^{(2-g)-}$ wherein $R^{19}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{20}$ is a group selected from the group consisting of an alkyl group, cycloalkyl group, vinyl group, aryl group, alkenyl group, alkynyl group and aralkyl group wherein the aforementioned group may be substituted with a substituent, and g is 0 or 1, a borinic acid anion represented by $R^{21}{}_2BO^-$ wherein $R^{21}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{21}$ may be the same or different, a silicic acid and a silicate ester anion represented by $(R^{22}O)_hSiO_{4-h}{}^{(4-h)-}$ wherein $R^{22}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, h is an integer of 0-3, and $R^{22}$ may be the same or different in case there are a plurality of $R^{22}$, a silicic acid and an anion of an organic silicon compound represented by $R^{23}{}_i(R^{24}O)_jSiO_{4-i-j}{}^{(4-i-j)-}$ wherein $R^{23}$ and $R^{24}$ are a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{23}$ and $R^{24}$ may be the same or different, i is an integer of 1-3, j is an integer of 0-2, i+j is an integer of 1-3, and $R^{23}$ and $R^{24}$ may be the same or different in case there are a plurality of $R^{23}$ or $R^{24}$.

According to still another embodiment of the present invention, the anion $A^-$ of the onium salt is at least one selected from the group consisting of a hydrogen sulfate anion; a hydrogen sulfite anion; a sulfonate anion represented by $R^1SO_3{}^-$ wherein $R^1$ represents an alkyl group, perfluoroalkyl group, cycloalkyl group, vinyl group, aryl group, perfluoroaryl group, aralkyl group or halogen atom; a bis(substituted sulfonyl)imide anion represented by $(R^3SO_2)(R^4SO_2)N^-$ wherein $R^3$ and $R^4$ represent an alkyl group, cycloalkyl group, vinyl group, aryl group, aralkyl group or halogen, the aforementioned groups respectively may have a substituent, and $R^3$ and $R^4$ may be the same or different; and a halogen anion.

Effect of the Invention

The two-part curable composition according to the present invention is long in pot life and good in workability since the first reagent containing a 2-cyanoacrylic acid ester is stably compatible with the second reagent containing a polymer having a hydrolyzable silyl group. Moreover, curability of the composition is excellent, and the resultant cured product has flexibility. When this curable composition is used as an adhesive, it exhibits excellent adhesion durability such as cold/hot cycle resistance and warm-water resistance.

When a curing accelerator for the 2-cyanoacrylic acid ester is further contained in at least one of the first and second reagents, much more excellent curability is exhibited.

DESCRIPTION OF EMBODIMENTS

Hereinafter, embodiments of the present invention will be described. However, the present invention is not limited thereto.

The two-part curable composition of the present invention comprises a first reagent containing at least a 2-cyanoacrylic acid ester and a second reagent containing at least a polymer having a hydrolyzable silyl group, in which an elastomer and a curing catalyst for the polymer are each contained in at least one of the first and second reagents.

1. The First Reagent

The first reagent of the two-part curable composition contains at least a component (a) "2-cyanoacrylic acid ester". As a 2-cyanoacrylic acid ester, any 2-cyanoacrylic acid ester that has generally been used in a 2-cyanoacrylic acid ester-based composition can be used without any limitation. The 2-cyanoacrylic acid ester includes, for instance, methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. Preferred among them from the viewpoint of obtaining curable compositions with improved curability are 2-cyanoacrylic acid esters having an alkyl group containing from 1 to 4 carbon atoms, and particularly preferred are alkyl 2-cyanoacrylates having an alkyl group containing from 1 to 4 carbon atoms. These 2-cyanoacrylic acid esters may be used alone or in a combination of two or more thereof.

The two-part curable composition of the present invention contains a component (b) "elastomer" in at least one of the first and second reagents. The elastomer in the present invention refers to a material having rubber elasticity around ordinary temperature (20° C.±15° C.), and is not particularly limited so long as it is a component soluble to both the 2-cyanoacrylic acid ester contained in the first reagent and the polymer having a hydrolyzable silyl group contained in the second reagent. The 2-cyanoacrylic acid ester and the polymer having a hydrolyzable silyl group are not miscible or compatible with each other, but the presence of the elastomer allows them to be stably compatibilized with each other. The elastomer includes, for example, an acrylic acid ester-based copolymer, an acrylonitrile-styrene-based copolymer, an acrylonitrile-butadiene-based copolymer, an acrylonitrile-butadiene-styrene-based copolymer, a styrene-butadiene-based copolymer, a styrene-isoprene-based copolymer, an ethylene-acrylic acid ester-based copolymer, an ethylene-propylene-based copolymer, an ethylene-vinyl acetate-based copolymer, a polyurethane-based copolymer, a polyester-based copolymer, a fluorinated copolymer, a polyisoprene-based copolymer, a chloroprene-based copolymer, or the like. They can be used alone or in a combination of two or more thereof.

Furthermore, among these elastomers, preferred is a copolymer resulting from a monomer capable of forming a polymer poorly soluble in 2-cyanoacrylic acid ester and a monomer capable of forming a polymer soluble in 2-cyanoacrylic acid ester (except for the carboxyl-group containing monomers listed below). This copolymer comprises a poorly soluble segment formed by polymerization of the monomer capable of forming a polymer poorly soluble in 2-cyanoacrylic acid ester and a soluble segment formed by polymerization of the monomer capable of forming a polymer soluble in 2-cyanoacrylic acid ester.

The monomer capable of forming a polymer poorly soluble in 2-cyanoacrylic acid ester is not particularly limited but includes ethylene, propylene, isoprene, butadiene, chloroprene, 1-hexene and cyclopentene, for example. These monomers can be used alone or in a combination of two or more thereof. As the monomer for forming the poorly soluble polymer, often used are ethylene, propylene, isoprene, butadiene, and chloroprene, and preferred is at least one of ethylene, propylene, isoprene, and butadiene.

The monomer capable of forming a polymer soluble in 2-cyanoacrylic acid ester also is not particularly limited but includes acrylic acid esters, methacrylic acid esters, vinyl chloride, vinyl acetate, vinyl ether, styrene and acrylonitrile, for example, and is preferably at least one of acrylic acid esters and methacrylic acid esters. Examples of the acrylic acid esters include methyl acrylate, ethyl acrylate, n-propyl acrylate, i-propyl acrylate, n-butyl acrylate, i-butyl acrylate, n-hexyl acrylate, n-heptyl acrylate, n-octyl acrylate, 2-ethylhexyl acrylate, methoxyethyl acrylate, methoxypropyl acrylate, ethoxyethyl acrylate, ethoxypropyl acrylate, or the like. These monomers can be used alone, or in a combination of two or more thereof.

Furthermore, examples of the methacrylic acid esters include methyl methacrylate, ethyl methacrylate, n-propyl methacrylate, i-propyl methacrylate, n-butyl methacrylate, i-butyl methacrylate, n-hexyl methacrylate, n-heptyl methacrylate, n-octyl methacrylate, 2-ethylhexyl methacrylate, methoxyethyl methacrylate, methoxypropyl methacrylate, ethoxyethyl methacrylate, ethoxypropyl methacrylate, or the like. These monomers can be used alone or in combination of two or more thereof. An acrylic acid ester and a methacrylic acid ester may be used in combination.

The proportion of the poorly soluble segment formed by polymerization of the monomer capable of forming a poorly soluble polymer and the soluble segment formed by polymerization of the monomer capable of forming a soluble polymer is not particularly limited so long as the poorly soluble segment accounts for 5 to 90 mol %, preferably 10 to 80 mol %, and the soluble segment accounts for 10 to 95 mol %, preferably 20 to 90 mol %, provided that the total of these segments is 100 mol %. More preferable proportion is from 30 to 80 mol % of the poorly soluble segment and from 20 to 70 mol % of the soluble segment; still preferable proportion is from 40 to 80 mol % of the poorly soluble segment and from 20 to 60 mol % of the soluble segment. Particularly preferable proportion is 50 to 75 mol % of the poorly soluble segment and from 25 to 50 mol % of the soluble segment. If the proportion of the poorly soluble segment is from 5 to 90 mol % and that of the soluble segment content is from 10 to 95 mol %, particularly, if the proportion of the poorly soluble segment is from 30 to 80 mol % and that of the soluble segment content is from 20 to 70 mol %, the copolymer can be properly dissolved in 2-cyanoacrylic acid ester to obtain an curable composition having excellent cold/hot cycle resistance in addition to high shear adhesion strength or the like.

The proportion of the respective segments can be calculated by integration values for proton measured by proton nuclear magnetic resonance spectroscopy (referred to hereinafter as "$^1$H-NMR").

Further, among the above elastomers, a particularly preferred example includes a copolymer comprising a monomer capable of forming a polymer poorly soluble in 2-cyanoacrylic acid ester, a monomer capable of forming a polymer soluble in 2-cyanoacrylic acid ester, and a monomer containing a carboxyl group. In general, only a small amount of the monomer containing a carboxyl group has to be contained in the copolymer. The monomer containing a carboxyl group is not particularly limited but includes acrylic acid, methacrylic acid, maleic acid, fumaric acid, itaconic acid, crotonic acid and cinnamic acid, for example. These monomers can be used alone or in a combination of two or more thereof. As the monomer containing a carboxyl group, frequently used are acrylic acid and methacrylic acid, which may be used alone or in combination thereof. The segment containing a carboxyl group, which is formed by polymerization of the monomer containing a carboxyl group, is a highly hydrophilic segment soluble in 2-cyanoacrylic acid ester. A curable composition having more excellent adhesion durability can be obtained when the elastomer is the copolymer having the carboxyl group.

The proportion of the segment containing a carboxyl group is not particularly limited but is preferably from 0.1 to 5 mol %, more preferably from 0.3 to 4 mol %, and particularly preferably from 0.4 to 3 mol %, provided that the total of the poorly soluble segment, the soluble segment, and the segment containing a carboxyl group is 100 mol %. Furthermore, the proportion is preferably from 0.5 to 2.5 mol %, and particularly preferably from 0.5 to 2.3 mol %. So long as the segment containing a carboxyl group is contained in a range of from 0.1 to 5 mol %, particularly from 0.5 to 2.5 mol %, a curable composition can be provided, which quickly hardens after application to adherends and exhibits excellent cold/hot cycle resistance in combination with warm water resistance.

The proportion of the segment containing a carboxyl group can be measured by potentiometric titration or by indicator titration in accordance with JIS K 0070.

Here, as the copolymer, can be used, for example, an ethylene/methylacrylate copolymer, an ethylene/methylacrylate/butylacrylate copolymer, an ethylene/methylmethacrylate copolymer, an ethylene/vinylacetate copolymer, a butadiene/methylacrylate copolymer, a butadiene/acrylonitrile copolymer, a butadiene/acrylonitrile/acrylate copolymer, a butadiene/styrene/acrylonitrile/methylacrylate copolymer, and the like. As the copolymer, particularly preferred are an ethylene/methylacrylate copolymer and an ethylene/methylacrylate/butylacrylate copolymer. A copolymer resulting from polymerization of monomers used in the above respective copolymers with a monomer containing a carboxyl group, such as acrylic acid and/or methacrylic acid, is also usable. These copolymers may be used alone or in a combination of two or more thereof, or a copolymer obtained without use of the monomer containing a carboxyl group may be used in combination with a copolymer obtained with use of the monomer containing a carboxyl group.

The average molecular weight of the elastomer is not particularly limited but is preferably in a range of from 5000 to 500000, more preferably from 15000 to 150000, and particularly preferably from 20000 to 100000 in terms of the number average molecular weight (Mn). So long as the number average molecular weight is in the range of from 5000 to 500000, the elastomer easily dissolves in 2-cyanoacrylic acid ester, and particularly, a curable composition maintaining high adhesion strength after the cold/hot cycle resistance test can be obtained. Further, the weight average molecular weight (Mw) of the elastomer is preferably in a range of from 5000 to 1000000, particularly from 10000 to 1000000, and Mw/Mn is preferably in a range of from 1.0 to 10.0, and particularly from 1.0 to 8.0.

The aforementioned elastomer is contained in at least one of the first and second reagents of the two-part curable composition, however, preferably contained in the first reagent from the viewpoint of solubility. When the elastomer is contained in the first reagent, the content thereof is in the range from 5 to 50 parts by mass, preferably 7 to 45 parts by mass and more preferably 10 to 40 parts by mass per 100 parts by mass of 2-cyanoacrylic acid ester. When the elastomer is contained the second reagent, the content thereof is in the range from 5 to 50 parts by mass per 100 parts by mass of the polymer having a hydrolyzable silyl group, and the preferable content is the same as the above. Moreover, when the elastomer is contained in both of the first and second reagents, the total amount thereof is in the range from 5 to 50 parts by mass per 100 parts by mass of 2-cyanoacrylic acid ester, and the preferable content is the same as the above. When the content of the elastomer is less than 5 parts by mass, sufficient compatibility cannot be established between the 2-cyanoacrylic acid ester and the polymer having a hydrolyzable silyl group, and as a result, an excellent adhesion property cannot be obtained. On the other hand, when the content of the elastomer exceeds 50 parts by mass, adhesion rate may be lowered.

The first reagent can be blended with a stabilizer of a 2-cyanoacrylic acid ester in addition to the above component as long as it does not impair curability of the composition. The stabilizer includes [1] anion polymerization inhibitors, such as sulfur dioxide, aliphatic sulfonates such as methanesulfonate, aromatic sulfonates such as p-toluenesulfonate, boron trifluoride complexes such as boron trifluoride methanol and boron trifluoride diethyl ether, $HBF_4$, and trialkyl borate; and [2] radical polymerization inhibitors such as hydroquinone, hydroquinone monomethyl ether, t-butylcatechol, catechol, pyrogallol and hindered phenol. These stabilizers may be used alone, or in a combination of two or more thereof.

2. The Second Reagent

The second reagent of the two-part curable composition contains at least a component (c) "a polymer having a hydrolyzable silyl group". By adding the component (c), flexibility can be imparted to the cured product. Also, the adhesion durability such as cold/hot cycle resistance and warm-water resistance can be improved.

The hydrolyzable silyl group contained in the above component (c) has a silicon and a hydroxyl group and/or a hydrolyzable functional group bonded to the silicon, which, upon hydrolysis, forms a siloxane bonding and a crosslinked structure. There is no particular limitation for the hydrolyzable silyl group, but preferred are the groups represented by the general formula (2) below:

(2)

wherein $R^{25}$ each independently represents a hydrocarbon group; X each independently represents a reactive group selected from a halogen, a hydrogen atom, a hydroxyl group, an alkoxy group, an acyloxy group, a ketoxime group, an amide group, an acid amide group, a mercapto group, an alkenyloxy group, and an aminoxy group; and n is 0, 1, or 2.

In the above general formula (2), $R^{25}$ preferably is an alkyl group having from 1 to 20 carbon atoms, an aryl group having from 6 to 20 carbon atoms, or an aralkyl group having from 7 to 20 carbon atoms. When n is 2, the plurality of $R^{25}$ may be the same or different. When n is 0 or 1, the plurality of X may be the same or different. In the above general formula (2), X is preferably an alkoxy group.

Because the above component (c) has a hydrolyzable silyl group, Si—O—Si bonds are established by hydrolytic condensation to form a cured body, such as a film, which exhibits excellent strength. In the above general formula (2), when X is an alkoxy group, the hydrolyzable silyl group is an alkoxysilyl group, such as trimethoxysilyl group, methyldimethoxysilyl group, dimethylmethoxysilyl group, triethoxysilyl group, methyldiethoxysilyl group, and methylbis (2-methoxyethoxy)silyl group. From the viewpoint of balanced setting rate and flexibility, particularly preferred among them are trimethoxysilyl group and methyldimethoxysilyl group.

The average number of the hydrolyzable silyl group per molecule of the above component (c) is preferably 1 to 4, more preferably 1.5 to 3. When the number of the hydrolyzable silyl group is in a range from 1 to 4, the setting of the composition is quick, and the hardened product is excellent in flexibility and adhesion properties.

Furthermore, the position of the hydrolyzable silyl group contained in the above component (c) is not particularly limited, and may be located in side chains and/or at terminals of the polymer.

The main chain chemical structure of the above mentioned component (c) is preferably at least one type of polymer selected from the group consisting of oxyalkylene polymer, vinyl polymer, polyester polymer, polyurethane polymer, and polycarbonate polymer. Among them, more preferred from the viewpoint of the flexibility of the cured product and the stability upon mixing with 2-cyanoacrylic acid ester are oxyalkylene polymer and vinyl polymer. The above polymer may be either a straight chain polymer or a branched polymer. It may also be a combination thereof.

The above oxyalkylene polymer is not particularly limited so long as it contains a repetition unit expressed by the general formula (3) below.

$$-O-R^{26}- \quad (3)$$

In the above formula, $R^{26}$ represents a divalent hydrocarbon group.

As $R^{26}$ in the above general formula (3), there can be mentioned $-CH(CH_3)-CH_2-$, $-CH(C_2H_5)-CH_2-$, $-C(CH_3)_2-CH_2-$, $-CH_2CH_2CH_2CH_2-$, and the like. Preferred among them is $-CH(CH_3)-CH_2-$. The above oxyalkylene polymer may contain one type of the above repetition unit alone, or may contain two or more types in combination thereof.

The method of producing the above oxyalkylene polymer is not particularly limited, however, there can be mentioned a production method using an alkali catalyst such as KOH, a production method using a transition metal compound-porphyrin complex catalyst, a production method using a complex-metal cyanide complex catalyst, a production method using phosphazene, and the like. Among these, the production method using a complex-metal cyanide complex catalyst is suitable for obtaining polymers with high molecular weight and having a narrow molecular weight distribution. Furthermore, the use of this polymer is preferred since the viscosity of the curable composition is well-balanced with the breaking elongation of the hardened product.

The above mentioned vinyl polymers are not particularly limited so long as they result from polymerization of a vinyl monomer capable of causing radical polymerization. The vinyl monomers include (meth)acrylic acid based monomers such as (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxypropyl (meth)acrylate, 2-hydroxyethyl (meth) acrylate, 2-hydroxypropyl (meth)acrylate, stearyl (meth) acrylate, ethylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth) acrylate, and 2-perfluorohexadecylethyl (meth)acrylate; styrene monomers such as styrene, vinyltoluene, α-methylstyrene, chlorostyrene, styrenesulfonic acid and its salts, or the like; fluorine-containing vinyl monomers such as perfluoroethylene, perfluoropropylene, and vinylidene fluoride; maleic anhydride, maleic acid, and monoalkyl esters and dialkyl esters of maleic acid; fumaric acid and monoalkyl esters and dialkyl esters of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; a nitrile-group containing vinyl-based monomer such as acrylonitrile and methacrylonitrile; an amido-group containing vinyl-based monomer such as acrylamide and methacrylamide; a vinyl ester such as vinyl acetate, vinyl propionate, vinyl pivalate, vinyl benzoate and vinyl cinnamate; an alkene such as ethylene and propylene; a conjugate diene such as butadiene and isoprene; vinyl chloride, vinylidene chloride, allyl chloride and allyl alcohol. These can be used alone or, two or more of these may be copolymerized. In the above notation, for example, (meth)acrylic acid represents acrylic acid or methacrylic acid.

The vinyl polymer having a hydrolyzable silyl group can be produced by a method known in the art disclosed in, for instance, Japanese Patent Publication (Laid-open) No. S59-122541, Japanese Patent Publication (Laid-open) No. S60-31556, Japanese Patent Publication (Laid-open) No. S63-112642, and Japanese Patent Publication (Laid-open) No. H6-172631.

Further, as a polymer having a hydrolyzable silyl group, there can be used a graft copolymer having an alkoxysilyl group. Such a copolymer is disclosed in, for example, International Publication WO2007/023669.

Furthermore, the polymer having a hydrolyzable silyl group used in the present invention may contain a polar element portion in the molecule. The polar element portion herein refers to a urethane bond, thiourethane bond, urea bond, thiourea bond, substituted urea bond, substituted thiourea bond, amide bond, sulfide bond and the like. A method of manufacturing this type of a setting resin containing a polar element portion within the molecule is disclosed in, for example, Japanese Patent Publication (Laid-open) No. 2000-169544 and the like.

The number average molecular weight of the above component (c) is preferably in a range of from 500 to 50000, more preferably, from 1000 to 40000, and further preferably, from 3000 to 35000. So long as the number average molecular weight is in the range of from 500 to 50000, a curable composition whose hardened product exhibits favorable flexibility and excellent resistances to cold/hot cycles and warm water can be obtained.

A mass ratio of the component (a) to the component (c) (component (a):component (c)) is preferably 100:10-100, more preferably 100:10-70 and still more preferably 100: 20-50. When the mass ratio is 100:10-100, the first and second reagents are stably compatible with each other, and the resulting cured product has flexibility.

The average molecular weight in the present invention is a value measured by gel permeation chromatography (hereinafter, simply referred to as "GPC"). The GPC measurement is carried out using a polystyrene gel column with tetrahydrofuran as mobile phase. The molecular weight was obtained as a polystyrene-converted value.

The two-part curable composition of the present invention comprises a component (d) "a curing catalyst for the polymer having a hydrolyzable silyl group" in at least one of the above first reagent and the second reagent. As the curing catalyst, a conventionally known silanol condensation catalyst or acid catalyst can be used. When an acid catalyst is used as the curing catalyst, it can be blended in at least one of the first and second reagents, however, when a silanol condensation catalyst is used, it is necessarily blended in the second reagent from the viewpoint of stability of the first reagent. Among them, a metal-based catalyst is preferable because of its catalytic activity and little effect on 2-cyanoacrylic acid ester contained in the first reagent. Further, more preferred from the viewpoint of compatibility with the component (c) is a metal-based catalyst having a metal element and an organic group bonded to the metal element via oxygen. Examples of the metal element may be any of typical metal elements and transition metal elements, and are preferably titanium, zirconium, hafnium, tin, aluminium, zinc and the like. Among them, more preferred are titanium, zirconium, hafnium, tin and aluminium. Moreover, examples of the organic group include an alkoxy group, acetyl acetone, acetoacetic ester, carboxyl group and phenoxy group. Among them, preferred are an alkoxy group, acetyl acetone, acetoacetic ester and carboxyl group.

A metal-based catalyst contained in the second reagent is not particularly limited so long as it is a metal-based catalyst having the above metal element and the organic group bonded to the metal element via oxygen. Concrete examples thereof include lithium naphthenate, sodium stearate, potassium octanoate, magnesium naphthenate, calcium octanoate, barium octanoate, yttrium octanoate, tetraisopropyl titanate, tetra-n-butyl titanate, tetra-t-butyl tianate, tetra-t-amyl titanate, di-t-amyldiisopropyl titanate, tetraoctyl titanate, tetrastearyl titanate, titanium acetylacetonate, titanium ethylacetoacetate, titanium diisopropoxy bis(ethylacetoacetate), tetraisopropyl zirconate, tetra-n-butyl zirconate, zirconium tributoxymonoacetyl acetonate, zirconium monobutoxyacetyl acetonate bis(ethylacetoacetate), zirconium tetraacetyl acetonate, tetramethoxy hafnium, tetraethoxy vanadium, tetraisopropoxy vanadium, tetrabutoxy hafnium, tetrapentoxy hafnium, vanadyl acetylacetonate, vanadium acetylacetonate, chromium acetylacetonate, manganese acetylacetonate, iron octanoate, cobalt naphthenate, cobalt octanoate, nickel acetylacetonate, copper naphthenate, copper acetylacetonate, zinc acetylacetonate monohydrate, zinc naphthenate, zinc octanoate aluminium acetylacetonate, aluminium tributoxide, aluminium ethylacetoacetate, indium acetylacetonate, dibutyltin dilaurate, dibutyltin diacetate, dibutyltin diethylhexanoate, dibutyltin dioctate, bismuth naphthenate and bismuthtris(2-ethylhexanoate).

The total content of the metal-based catalyst is preferably from 0.01 to 10 parts by mass, more preferably from 0.02 to 5 parts by mass and furthermore preferably from 0.03 to 3 parts by mass relative to 100 parts by mass of a polymer having a hydrolyzable silyl group. When the content of the metal-based catalyst is from 0.01 to 10 parts by mass, curability of the composition is sufficiently maintained, and storage stability of the composition is also sufficiently maintained.

As a curing catalyst for the polymer having a hydrolyzable silyl group, an acid catalyst can also be used. Preferred as the acid catalyst is an acid having a pKa value at 25° C. of 4 or lower. More preferably, the pKa value is 3.0 or lower. An acid having a pKa value of 4 or lower enables the two-part curable composition to cure at a rate suitable for practical use. Specific examples of the acid catalysts include sulfonic acid, phosphoric acid, phosphoric acid monoester, phosphoric acid diester, phosphorous acid, phosphorous acid ester, and the like. Among them, preferred from curability are sulfonic acid, phosphoric acid, phosphoric acid monoester, and phosphoric acid diester.

The total content of the acid catalyst is preferably from 0.0005 to 0.5 parts by mass and more preferably from 0.015 to 0.3 parts by mass per 100 parts by mass of the polymer having a hydrolyzable silyl group. So long as the content of the acid catalyst is in the range of from 0.0005 to 0.5 parts by mass, curability of the composition is sufficiently maintained, storage stability of the composition is also sufficiently maintained, and degradation of curability of the first reagent can be prevented.

Moreover, the two-part curable composition of the present invention preferably contains "a curing accelerator for a 2-cyanoacrylic acid ester" in at least one of the first and second reagents. By adding the curing accelerator, curability of the two-part curable composition can be improved. Furthermore, the curing accelerator is preferably contained in the second reagent from the viewpoint of storage stability.

As the above curing accelerator, compounds conventionally known as the curing accelerator for 2-cyanoacrylate-based compositions can be used. Concrete examples include onium salts, polyalkylene oxides, crown ethers, silacrown ethers, calixarenes, cyclodextrins, and pyrogallol-based cyclic compounds. Among them, preferred from the viewpoint of curability are onium salts, crown ethers and calixarenes, and particularly preferred are onium salts.

The above onium salt is an onium salt represented by the following general formula (1).

wherein, $C^+$ is an onium cation and $A^-$ is one anion selected from the following anion group:

a hydrogen sulfate anion, a hydrogen sulfite anion, a sulfonate anion represented by $R^1SO_3^-$ wherein $R^1$ is a group selected from the group consisting of an alkyl group, cycloalkyl group, vinyl group, aryl group, alkenyl group, alkynyl group and aralkyl group, or a halogen atom, and the aforementioned group may be substituted with a substituent, a sulfate anion represented by $R^2OSO_3^-$ wherein $R^2$ is a group selected from the group consisting of an alkyl group, cycloalkyl group, vinyl group, aryl group, alkenyl group, alkynyl group and aralkyl group, and the aforementioned group may be substituted with a substituent, a bis(substituted sulfonyl)imide anion represented by $(R^3SO_2)(R^4SO_2)N^-$ wherein $R^3$ and $R^4$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, an imide anion represented by $(R^5CO)(R^6CO)N^-$ wherein $R^5$ and $R^6$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, an sulfonylimide anion represented by $(R^7SO_2)(R^8CO_2)N^-$ wherein $R^7$ and $R^8$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, a perhalogenated lewis acid anion, a tetrafluoroborate anion, a hexafluorophosphate anion, a halogen anion, a nitrate anion, $CN^-$, $SCN^-$, $OCN^-$, $N(CN)_2^-$, a phosphoric acid anion and a phosphate anion represented by $(R^9O)_aPO_{4-a}^{(3-a)-}$ wherein $R^9$ is a group selected from the group consisting of an alkyl group, cycloalkyl group, vinyl group, aryl group, alkenyl group, alkynyl group and aralkyl group wherein the aforementioned group may be substituted with a substituent, a is an integer of 0-2, and $R^9$ may be the same or different in case there are a plurality of $R^9$, a phosphonic acid anion and a phosphonate anion represented by $R^{10}(R^{11}O)^b PO_{3-b}^{(2-b)-}$ wherein $R^{10}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{11}$ is a group selected from the group consisting of an alkyl group, cycloalkyl group, vinyl group, aryl group, alkenyl group, alkynyl group and aralkyl group wherein the aforementioned group may be substituted with a substituent, and b is 0 or 1, a phosphinic acid anion represented by $R^{12}{}_2PO_2^-$ wherein $R^{12}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{12}$ may be the same or different, a phosphorous acid anion and a phosphite anion represented by $(R^{13}O)_c PO_{3-c}^{(3-c)-}$ wherein $R^{13}$ is a group selected from the group consisting of an alkyl group, cycloalkyl group, vinyl group, aryl group, alkenyl group, alkynyl group and aralkyl group wherein the aforementioned group may be substituted with a substituent, c is an integer of 0-2, and $R^{13}$ may be the same or different in case there are a plurality of $R^{13}$, a phosphonous acid anion and a phosphonite anion represented by $R^{14}(R^{15}O)_d PO_{2-d}^{(2-d)-}$ wherein $R^{14}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{15}$ is a group selected from the group consisting of an alkyl group, cycloalkyl group, vinyl group, aryl group, alkenyl group, alkynyl group and aralkyl group wherein the aforementioned group may be substituted with a substituent, and d is 0 or 1, a phosphinic acid anion represented by $R^{16}2PO^-$ wherein $R^{16}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{16}$ may be the same or different, a carboxylic acid anion represented by $R^{17}CO_2^-$ wherein $R^{17}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, a carbonate anion represented by $CO_3^{2-}$, a boric acid and a borate anion represented by $(R^{18}O)_f BO_{3-f}^{(3-f)-}$ wherein $R^{18}$ is a group selected from the group consisting of an alkyl group, cycloalkyl group, vinyl group, aryl group, alkenyl group, alkynyl group and aralkyl group wherein the aforementioned group may be substituted with a substituent, f is an integer of 0-2, and $R^{18}$ may be the same or different in case there are a plurality of $R^{18}$, a boronic acid and a boronate anion represented by $R^{19}(R^{20}O)_g BO_{2-g}^{(2-g)-}$ wherein $R^{19}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{20}$ is a group selected from the group consisting of an alkyl group, cycloalkyl group, vinyl group, aryl group, alkenyl group, alkynyl group and aralkyl group wherein the aforementioned group may be substituted with a substituent, and g is 0 or 1, a borinic acid anion represented by $R^{21}{}_2BO^-$ wherein $R^{21}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{21}$ may be the same or different, a silicic acid and a silicate ester anion represented by $(R^{22}O)_h SiO_{4-h}^{(4-h)-}$ wherein $R^{22}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, h is an integer of 0-3, and $R^{22}$ may be the same or different in case there are a plurality of $R^{22}$, a silicic acid and an anion of an organic silicon compound represented by $R^{23}{}_i(R^{24}O)_j SiO_{4-i-j}^{(4-i-j)-}$ wherein $R^{23}$ and $R^{24}$ are a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{23}$ and $R^{24}$ may be the same or different, i is an integer of 1-3, j is an integer of 0-2, i+j is an integer of 1-3, and $R^{23}$ and $R^{24}$ may be the same or different in case there are a plurality of $R^{23}$ or $R^{24}$.

Meanwhile, the alkyl group represented by $R^1$ to $R^{24}$ preferably contains from 1 to 15 carbon atoms.

The cations of the onium salt above include an onium cation represented by the following general formula (4), an imidazolium cation, a pyridinium cation, and an onium cation represented by the following general formula (5):

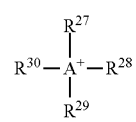

(4)

wherein $R^{27}$ to $R^{30}$ each independently represents a group selected from the group consisting of an alkyl group having from 1 to 20 carbon atoms, cycloalkyl group, aryl group, aralkyl group, alkenyl group and alkynyl group, and the above group may be substituted with a substituent; otherwise, part or all of $R^{27}$ to $R^{30}$ may form a non-substituted or substituted 3 to 10 membered ring together with the element represented by A wherein the ring may contain a hetero atom such as O and S, provided that $R^{27}$ to $R^{30}$ which do not involve the formation of the ring are the same as defined hereinbefore; and A represents a nitrogen or phosphorus. Specific examples of the above substituted alkyl group include, for example, an alkoxy group and an alkanoyl group. When part of $R^{27}$ to $R^{30}$ form a ring, the ring is, in general, constituted by 2 to 3 of $R^{27}$ to $R^{30}$. Specific examples of the compound represented by the formula (4) in which two of $R^{27}$ to $R^{30}$ form a ring include piperidinium cation, morpholinium cation, and pyrrolidinium cation.

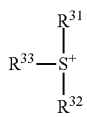

$$R^{33}-\overset{R^{31}}{\underset{R^{32}}{S^+}} \quad (5)$$

wherein $R^{31}$ to $R^{33}$ each independently represents a group selected from the group consisting of an alkyl group having from 1 to 20 carbon atoms, cycloalkyl group, aryl group, aralkyl group, alkenyl group and alkynyl group, and the above group may be substituted with a substituent; otherwise, part or all of $R^{31}$ to $R^{33}$ may form a non-substituted or substituted 3 to 10 membered ring together with the sulfur wherein the ring may contain a hetero atom such as O and S, provided that $R^{31}$ to $R^{33}$ which do not involve the formation of the ring are the same as defined hereinbefore. Specific examples of the above substituted alkyl group include, for example, an alkoxy group and an alkanoyl group.

Representative examples of the onium cations represented by the general formula (4) include a quaternary ammonium cation, a quaternary phosphonium cation, and the like.

Specific examples of the quaternary ammonium cations include tetraalkylammonium cations such as tetramethylammonium, ethyltrimethylammonium, diethyldimethylammonium, triethylmethylammonium, tetraethylammonium, tetra-n-butylammonium, trimethyl-n-propylammonium, isopropyl-trimethylammonium, n-butyltrimethylammonium, isobutyltrimethylammonium, t-butyltrimethylammonium, n-hexyltrimethylammonium, dimethyldi-n-propylammonium, dimethyldi-isopropylammonium, isopropyldimethyl-n-propylammonium, methyltri-n-propylammonium, tri-isopropylmethylammonium, isopropylmethyldi-n-propylammonium, methyl-n-propyldiisopropylammonium, triethyl-n-propylammonium, triethylisopropylammonium, n-butyltriethylammonium, triethylisobutylammonium, t-butyltriethylammonium, di-n-butyldimethylammonium, diisobutyldimethylammonium, di-t-butyldimethylammonium, n-butylethyldimethylammonium, isobutylethyldimethylammonium, t-butylethyldimethylammonium, n-butylisobutyldimethylammonium, n-butyl-t-butyldimethylammonium, t-butylisobutyldimethylammonium, diethyldi-n-propylammonium, diethyldiisopropylammonium, diethylisopropyl-n-propylammonium, ethyltri-n-propylammonium, ethyltriisopropylammonium, ethylisopropyldi-n-propylammonium, ethyldiisopropyl-n-propylammonium, diethylmethyl-n-propylammonium, ethyldimethyl-n-propylammonium, ethylmethyldi-n-propylammonium, diethylisopropylmethylammonium, ethylisopropyldimethylammonium, ethyldiisopropylmethylammonium, ethylmethyl-n-propylisopropylammonium, tetra-n-propylammonium, tetra-isopropylammonium, tri-isopropyl-n-propylammonium, diisopropyldi-n-propylammonium, isopropyl-tri-n-propylammonium, butyltrimethylammonium, trimethylpentylammonium, hexyltrimethylammonium, heptyltrimethylammonium, trimethyloctylammonium, trimethylnonylammonium, decyltrimethylammonium, trimethylundecylammonium, dodecyltrimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium, hexyldimethyloctylammonium, dodecyl (ferrocenylmethyl)dimethylammonium and N-methylhomatropinium; an aromatic alkyl group substituted ammonium cation such as benzyltrimethylammonium, benzyltributylammonium and benzyldodecyldimethylammonium; an aromatic substituted ammonium cation such as trimethylphenylammonium and tetraphenylammonium; and aliphatic cyclic ammonium cations such as pyrrolidinium (such as 1,1-dimethylpyrrolidinium, 1-ethyl-1-methylpyrrolidinium, 1,1-diethylpyrrolidinium, 1,1-tetramethylenepyrrolidinium, and 1-butyl-1-methylpyrrolidinium), piperidinium (such as 1,1-dimethylpiperidinium, 1-ethyl-1-methylpiperidinium, 1,1-diethylpiperidinium, and 1-butyl-1-methylpiperidinium), and morpholinium (such as 1,1-dimethylmorpholinium, 1-ethyl-1-methylmorpholinium, and 1,1-diethylmorpholinium).

Specific examples of the quaternary phosphonium cations include cations such as tetramethylphosphonium, triethylmethylphosphonium, and tetraethylphosphonium.

Specific examples of the imidazolium cations include cations such as 1,3-dimethylimidazolium, 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-methylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 2-n-heptyl-1,3-dimethylimidazolium, 1,3,4-trimethylimidazolium, 2-ethyl-1,3,4-trimethylimidazolium, 1,3-dimethylbenzimidazolium, 3-methyl-1-phenylimidazolium, 1-benzyl-3-methylimidazolium, 2,3-dimethyl-1-phenylimidazolium, 1-benzyl-2,3-dimethylimidazolium, 1,3-dimethyl-2-phenylimidazolium, 2-benzyl-1,3-dimethylimidazolium, 1,3-dimethyl-2-n-undecylimidazolium, and 1,3-dimethyl-2-n-heptadecylimidazolium.

The pyridinium cations include cations such as 1-methylpyridinium, 1-ethylpyridinium, 1-n-propylpyridinium, 1-isopropylpyridinium, 1-n-butylpyridinium, and 1-n-butyl-3-methylpyridinium.

Specific examples of the tertiary sulfonium cations represented by the general formula (5) above include cations such as trimethylsulfonium, triethylsulfonium, tripropylsulfonium, and triphenylsulfonium.

Among the aforementioned onium cations, preferred are quaternary ammonium cations, imidazolium cations, pyridinium cations, or tertiary sulfonium cations from the viewpoint of exhibiting excellent solubility in 2-cyanoacrylic acid ester and good balance between curing acceleration property and storage stability of the curable composition; and further preferred are quaternary ammonium cations, imidazolium cations, or pyridinium cations.

Among the aforementioned anions of the onium salt, preferred are hydrogen sulfate anion, hydrogen bisulfite anion, a sulfonate anion represented by $R^1SO_3^-$ (where $R^1$ is an alkyl group, perfluoroalkyl group, cycloalkyl group, vinyl group, aryl group, perfluoroaryl group, alkenyl group, alkylnyl group, aralkyl group, or halogen), a bis(substituted sulfonyl)imide anion represented by $(R^3SO_2)(R^4SO_2)N^-$ (where $R^3$ and $R^4$ are an alkyl group, perfluoroalkyl group, cycloalkyl group, vinyl group, aryl group, perfluoroaryl group, alkenyl group, alkylnyl group, aralkyl group, or halogen), tetrafluoroborate anion, hexafluorophosphate anion, halogen anion, or nitrate anion. Preferably, the alkyl group represented by $R^1$, $R^3$ or $R^4$ contains from 1 to 15 carbon atoms.

Specific examples of the aforementioned sulfonate anions represented by $R^1SO_3^-$ include anions such as methanesulfonate, ethanesulfonate, propanesulfonate, hexanesulfonate, heptanesulfonate, octanesulfonate, dodecanesulfonate, vinylsulfonate, benzenesulfonate, p-toluenesulfonate, dodecylbenzenesulfonate, 10-camphorsulfonate, pentafluorobenzenesulfonate, fluorosulfonate, chlorosulfonate, and bromosulfonate. The perfluoroalkylsulfonate anions include anion such as trifluoromethanesulfonate anion and perfluorooctanesulfonate anion. The perfluoroalkyl group should have from 1 to 10 carbon atoms, preferably from 1 to 8 carbon atoms, from the viewpoint of solubility of the corresponding onium salt in 2-cyanoacrylic acid ester.

Specific examples of the aforementioned bis(substituted sulfonyl)imide anion represented by $(R^3SO_2)(R^4SO_2)N^-$ include bis(alkanesulfonyl)imide anions such as bis(methanesulfonyl)imide anion, bis(ethanesulfonyl)imide anion and bis(propanesulfonyl)imide anion, bis(perfluoroalkanesulfonyl)imide anions such as bis(trifluoromethanesulfonyl)imide anion, bis(pentafluoroethanesulfonyl)imide anion, bis(heptafluoropropanesulfonyl)imide anion, and bis(nonafluorobutanesulfonyl)imide anion, and bis(fluorosulfonyl)imide anion.

Among these anions, preferred are hydrogen sulfate anions, perfluoroalkylsulfonate anions, bis(perfluoroalkane sulfonyl)imide anions, bis(fluorosulfonyl)imide anions, tetrafluoroborate anion, hexafluorophosphate anion, halogen anion, and nitrate anion, and particularly preferred are hydrogen sulfate anions, perfluoroalkylsulfonate anions, bis(perfluoroalkane sulfonyl)imide anions and bis(fluorosulfonyl)imide anions, from the viewpoint of exhibiting excellent curing rate on metals and plastics and of imparting excellent storage stability to the curable composition.

Furthermore, in case the outer appearance of the cured product is an issue, preferred are hydrogen sulfate anion, hydrogen bisulfite anion, or a sulfonate anion represented by $R^1SO_3^-$ (where $R^1$ is an alkyl group, cycloalkyl group, aryl group, or aralkyl group), from the viewpoint of avoiding clouding of the cured product and exhibiting excellent adhesion rate.

The onium salt used in the present invention is not particularly limited so long as it is a combination of the cations and anions described hereinbefore. Specific examples of the onium salts include tetraethylammonium hydrogensulfate, tetra-n-butylammonium hydrogensulfate, methyltri-n-octyl ammonium hydrogensulfate, amyltriethylammonium hydrogensulfate, cyclohexyltrimethylammonium hydrogensulfate, 1-ethyl-3-methylimidazolium hydrogensulfate, 1-ethyl-2,3-dimethylimidazolium hydrogensulfate, 1-butyl-3-methylimidazolium hydrogensulfate, 1-butyl-2,3-dimethylimidazolium hydrogensulfate, 1-methyl-3-n-octylimidazolium hydrogensulfate, 1-hexyl-3-methylimidazolium hydrogensulfate, 2-ethyl-1,3-dimethylimidazolium hydrogensulfate, 1,3-dimethyl-2-n-propylimidazolium hydrogensulfate, 1,3-dimethyl-2-n-pentylimidazolium hydrogensulfate, 1,3-dimethyl-2-n-heptylimidazolium hydrogensulfate, 1-ethyl-1-methylpiperidinium hydrogensulfate, 1-butyl-1-methylpiperidinium hydrogensulfate, 1-ethyl-1-methylpyrrolidinium hydrogensulfate, 1-butyl-1-methylpyrrolidinium hydrogensulfate, 1-methyl-1-propylpyrrolidinium hydrogensulfate, 1-ethylpyridinium hydrogensulfate, 1-ethyl-3-methylpyridinium hydrogensulfate, 1-butyl-3-methylpyridinium hydrogensulfate, 1-ethyl-4-methylpyridinium hydrogensulfate, 1-butylpyridinium hydrogensulfate, 1-butyl-4-methylpyridinium hydrogensulfate, tetramethylphosphonium hydrogensulfate, triethylmethylphosphonium hydrogensulfate, tetraethylphosphonium hydrogensulfate, tetra-n-butylammonium methanesulfonate, methyltri-n-octylammonium methanesulfonate, 1-ethyl-3-methylimidazolium methanesulfonate, 1-ethyl-2,3-dimethylimidazolium methanesulfonate, 1-butyl-3-methylimidazolium methanesulfonate, 1-butyl-2,3-dimethylimidazolium methanesulfonate, 1-ethyl-1-methylpiperidinium methanesulfonate, 1-butyl-1-methylpiperidinium methanesulfonate, 1-ethyl-1-methylpyrrolidinium methanesulfonate, 1-butyl-1-methylpyrrolidinium methanesulfonate, 1-methyl-1-propylpyrrolidinium methanesulfonate, 1-ethylpyridinium methanesulfonate, 1-ethyl-3-methylpyridinium methanesulfonate, 1-butyl-3-methylpyridinium methanesulfonate, tetraethylphosphonium methanesulfonate, tetra-n-butylammonium p-toluenesulfonate, methyltri-n-octylammonium p-toluenesulfonate, 1-ethyl-3-methylimidazolium p-toluenesulfonate, 1-ethyl-2,3-dimethylimidazolium p-toluenesulfonate, 1-butyl-3-methylimidazolium p-toluenesulfonate, 1-butyl-2,3-dimethylimidazolium p-toluenesulfonate, 1-ethyl-1-methylpiperidinium p-toluenesulfonate, 1-butyl-1-methylpiperidinium p-toluenesulfonate, 1-ethyl-1-methylpyrrolidinium p-toluenesulfonate, 1-butyl-1-methylpyrrolidinium p-toluenesulfonate, 1-methyl-1-propylpyrrolidinium p-toluenesulfonate, 1-ethylpyridinium p-toluenesulfonate, 1-ethyl-3-methylpyridinium p-toluenesulfonate, 1-butyl-3-methylpyridinium p-toluenesulfonate, tetraethylphosphonium p-toluenesulfonate, tetraethylammonium trifluoromethanesulfonate, tetra-n-butylammonium trifluoromethanesulfonate, methyltri-n-butylammonium trifluoromethanesulfonate, methyltri-n-octylammonium trifluoromethanesulfonate, amyltriethylammonium trifluoromethanesulfonate, cyclohexyltrimethylammonium trifluoromethanesulfonate, benzyltributylammonium trifluoromethanesulfonate, benzyldodecyldimethylammonium trifluoromethanesulfonate, didecyldimethylammonium trifluoromethanesulfonate, dilauryldimethylammonium trifluoromethanesulfonate, hexyldimethyloctylammonium trifluoromethanesulfonate, dodecyl(ferrocenylmethyl)dimethylammonium trifluoromethanesulfonate, 1-ethyl-3-methylimidazolium trifluoromethanesulfonate, 1-ethyl-2,3-dimethylimidazolium trifluoromethanesulfonate, 1-butyl-3-methylimidazolium trifluoromethanesulfonate, 1-butyl-2,3-dimethylimidazolium trifluoromethanesulfonate, 1-methyl-3-n-octylimidazolium trifluoromethanesulfonate, 1-hexyl-3-methylimidazolium trifluoromethanesulfonate, 2-ethyl-1,3-dimethylimidazolium trifluoromethanesulfonate, 1,3-dimethyl-2-n-propylimidazolium trifluoromethanesulfonate, 1,3-dimethyl-2-n-pentylimidazolium trifluoromethanesulfonate, 1,3-dimethyl-2-n-heptylimidazolium trifluoromethanesulfonate, 1-ethyl-1-methylpiperidinium trifluoromethanesulfonate, 1-butyl-1-methylpiperidinium trifluoromethanesulfonate, 1-ethyl-1-methylpyrrolidinium trifluoromethanesulfonate, 1-butyl-1-methylpyrrolidinium trifluoromethanesulfonate, 1-methyl-1-propylpyrrolidinium trifluoromethanesulfonate, 1-ethylpyridinium trifluoromethanesulfonate, 1-ethyl-3-methylpyridinium trifluoromethanesulfonate, 1-butyl-3-methylpyridinium trifluoromethanesulfonate, 1-ethyl-4-methylpyridinium trifluoromethanesulfonate, 1-butylpyridinium trifluoromethanesulfonate, 1-butyl-4-methylpyridinium trifluoromethanesulfonate, tetramethylphosphonium trifluoromethanesulfonate, triethylmethylphosphonium trifluoromethanesulfonate, tetraethylphosphonium trifluoromethanesulfonate, tetraethylammonium bis(trifluoromethanesulfonyl)imide, tetra-n-butylammonium bis(trifluoromethanesulfonyl)imide, methyltri-n-octylammonium bis(trifluoromethanesulfonyl)imide, 1-ethyl-3-methylimidazolium bis(trifluoromethanesulfonyl)imide, 1-ethyl-2,3-dimethylimidazolium bis(trifluoromethanesulfonyl)imide, 1-butyl-3-methylimidazolium bis(trifluoromethanesulfonyl)imide, 1-butyl-2,3-dimethylimidazolium bis(trifluoromethanesulfonyl)imide, 1-ethyl-1-methylpiperidinium bis(trifluoromethanesulfonyl)imide, 1-butyl-1-methylpiperidinium bis(trifluoromethanesulfonyl)imide, 1-ethyl-1-methylpyrrolidinium bis(trifluoromethanesulfonyl)imide, 1-butyl-1-methylpyrrolidinium bis(trifluoromethanesulfonyl)imide, 1-methyl-1-propylpyrrolidinium bis(trifluoromethanesulfonyl)imide, 1-ethylpyridinium bis(trifluoromethanesulfonyl)imide, 1-ethyl-3-methylpyridinium bis(trifluoromethanesulfonyl)imide, 1-butyl-3-methylpyridinium bis(trifluoromethanesulfonyl)imide, triethylsulfonium bis(trifluoromethanesulfonyl)imide, tetraethylammonium bis(fluorosulfonyl)imide, tetra-n-butylammonium bis(fluorosulfonyl)imide, methyltri-n-butylammonium bis(fluorosulfonyl)imide, methyltri-n-octylammonium bis(fluorosulfonyl)imide, amyltriethylammonium bis(fluorosulfonyl)imide, cyclohexyltrimethylammonium bis(fluorosulfonyl)imide, benzyltributylammonium bis(fluorosulfonyl)imide, benzyldodecyldimethylammonium bis(fluorosulfonyl)imide, didecyldimethylammonium bis(fluorosulfonyl)imide, dilauryldimethylammonium bis(fluorosulfonyl)imide, hexyldimethyloctylammonium bis(fluorosulfonyl)imide, dodecyltrimethylammonium bis(fluorosulfonyl)imide, dodecyl(ferrocenylmethyl) dimethylammonium bis(fluorosulfonyl)imide, 1-ethyl-3-methylimidazolium bis(fluorosulfonyl)imide, 1-ethyl-2,3-dimethylimidazolium bis(fluorosulfonyl)imide, 1-butyl-3-methylimidazolium bis(fluorosulfonyl)imide, 1-butyl-2,3-dimethylimidazolium bis(fluorosulfonyl)imide, 1-methyl-3-n-octylimidazolium bis(fluorosulfonyl)imide, 1-hexyl-3-methylimidazolium bis(fluorosulfonyl)imide, 2-ethyl-1,3-dimethylimidazolium bis(fluorosulfonyl)imide, 1,3-dimethyl-2-n-propylimidazolium bis(fluorosulfonyl)imide, 1,3-dimethyl-2-n-pentylimidazolium bis(fluorosulfonyl)imide, 1,3-dimethyl-2-n-heptylimidazolium bis(fluorosulfonyl)imide, 1-ethyl-1-methylpiperidinium bis(fluorosulfonyl)imide, 1-butyl-1-methylpiperidinium bis(fluorosulfonyl)imide, 1-ethyl-1-methylpyrrolidinium bis(fluorosulfonyl)imide, 1-butyl-1-methylpyrrolidinium bis(fluorosulfonyl)imide, 1-methyl-1-propylpyrrolidinium bis(fluorosulfonyl)imide, 1-ethylpyridinium bis(fluorosulfonyl)imide, 1-ethyl-3-methylpyridinium bis(fluorosulfonyl)imide, 1-butyl-3-methylpyridinium bis(fluorosulfonyl)imide, 1-ethyl-4-methylpyridinium bis(fluorosulfonyl)imide, 1-butylpyridinium bis(fluorosulfonyl)imide, 1-butyl-4-methylpyridinium bis(fluorosulfonyl)imide, 4-methyl-1-octylpyridinium bis(fluorosulfonyl)imide, tetramethylphosphonium bis(fluorosulfonyl)imide, triethylmethylphosphonium bis(fluorosulfonyl)imide, tetraethylphosphonium bis(fluorosulfonyl)imide, tetraethylammonium chloride, tetra-n-butylammonium chloride, methyltri-n-octylammonium chloride, 1-ethyl-3-methylimidazolium chloride, 1-ethyl-2,3-dimethylimidazolium chloride, 1-butyl-3-methylimidazolium chloride, 1-butyl-2,3-dimethylimidazolium chloride, 1-ethyl-1-methylpiperidinium chloride, 1-butyl-1-methylpiperidinium chloride, 1-ethyl-1-methylpyrrolidinium chloride, 1-butyl-1-methylpyrrolidinium chloride, 1-methyl-1-propylpyrrolidinium chloride, 1-ethylpyridinium chloride, 1-ethyl-3-methylpyridinium chloride, 1-butyl-3-methylpyridinium chloride, triethylsulfonylchloride, tetraethylammonium bromide, tetra-n-butylammonium bromide, methyltri-n-octylammonium bromide, 1-ethyl-3-methylimidazolium bromide, 1-ethyl-2,3-dimethylimidazolium bromide, 1-butyl-3-methylimidazolium bromide, 1-butyl-2,3-dimethylimidazolium bromide, 1-ethyl-1-methylpiperidinium bromide, 1-butyl-1-methylpiperidinium bromide, 1-ethyl-1-methylpyrrolidinium bromide, 1-butyl-1-methylpyrrolidinium bromide, 1-methyl-1-propylpyrrolidinium bromide, 1-ethylpyridinium bromide, 1-ethyl-3-methylpyridinium bromide, 1-butyl-3-methylpyridinium bromide, triethylsulfonium bromide, tetrabutylammonium tetrafluoroborate, 1-ethyl-3-methylimidazolium tetrafluoroborate, tetrabutylammonium hexafluorophosphate and 1-butyl-3-methylimidazolium hexafluorophosphate.

The aforementioned onium salt can be obtained by methods known in the art. For instance, they can be prepared from the corresponding onium halides as described in, Hiroyuki Ohno et al., J. Am. Chem. Soc., 2005, 127, 2398-2399; or in Peter Wasserscheid et al., Green Chemistry, 2002, 4, 134-138.

Among the aforementioned curing accelerators, the polyalkylene oxides refer to polyalkylene oxides and the derivatives thereof, and examples thereof include those disclosed in Japanese Patent Publication (Kokoku) No. S60-37836, Japanese Patent Publication (Kokoku) No. H1-43790, Japanese Patent Publication (Laid-Open) No. S63-128088, Japanese Patent Publication (Laid-Open) No. H3-167279, U.S. Pat. No. 4,386,193, and U.S. Pat. No. 4,424,327. Concrete examples thereof include (1) polyalkylene oxides such as diethylene glycol, triethylene glycol, polyethylene glycol, and polypropylene glycol; and (2) derivatives of polyalkylene oxides such as polyethylene glycol monoalkyl esters, polyethylene glycol dialkyl esters, polypropylene glycol dialkyl esters, diethylene glycol monoalkyl ethers, diethylene glycol dialkyl ethers, dipropylene glycol monoalkyl ethers, and dipropylene glycol dialkyl ethers. Further, examples of the crown ethers include those disclosed in, for instance, Japanese Patent Publication (Kokoku) No. S55-2236 and Japanese Patent Publication (Laid-Open) No. H3-167279. Concrete examples thereof include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. Examples of the silacrown ethers include, for example, those disclosed in Japanese Patent Publication (Laid-Open) No. S60-168775. Concrete examples thereof include dimethylsila-11-crown-4, dimethylsila-14-crown-5, and dimethylsila-17-crown-6. Furthermore, examples of the calixarenes include those disclosed in Japanese Patent Publication (Laid-Open) No. S60-179482, Japanese Patent Publication (Laid-Open) No. S62-235379, and Japanese Patent Publication (Laid-Open) No. S63-88152. Concrete examples thereof include 5,11,17,23,29,35-hexa-tert-butyl-37, 38, 39, 40, 41, 42-hexahydroxycalix[6]arene, 37,38,39,40,41,42-hexahydroxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene, and tetrakis(4-t-butyl-2-methylenephenoxy)ethyl acetate. Examples of the cyclodextrins include those disclosed in Japanese Patent Publication (Kohyo) No. H5-505835. Concrete examples thereof include α-, β-, or γ-cyclodextrins. Examples of the pyrogallol-based cyclic compounds include compounds disclosed in Japanese Patent Publication (Laid-Open) No. 2000-191600. Concrete examples thereof include 3,4,5,10,11,12,17,18,19,24,25,26-dodecaethoxycarbomethoxy-C-1, C-8,C-15,C-22-tetramethyl[14]-metacyclophane. These curing accelerators may be used alone or in combination of two or more thereof.

The content of the aforementioned curing accelerator in the curable composition is, preferably from 0.001 to 15 parts by mass, more preferably from 0.005 to 10 parts by mass, and still more preferably from 0.01 to 5 parts by mass, per 100 parts by mass of 2-cyanoacrylic acid ester. So long as the above content is in the range of from 0.001 to 15 parts by mass, the curing accelerator works without impairing storage stability of the curable composition.

In addition to the aforementioned respective components, the first and second reagents constituting the two-part curable composition may contain another component within the ranges that do not impair curability and adhesiveness. Examples of another component include plasticizers, thickeners, fumed silica, particles, fillers, colorants, fragrances, solvents, strength improvers and the like.

A plasticizer may be incorporated so long as the effect of the invention is not impaired; in particular, when the elastomer component is constituted by a copolymer resulting from a larger amount of monomers capable of forming the poorly soluble polymers, i.e., a copolymer containing a larger amount of the poorly soluble segments (a copolymer containing 65 mol % or more of the poorly soluble segments), the addition of the plasticizer in a proper quantity improves the solubility thereof. Examples of the plasticizer includes triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexylcyclohexyl carboxylate, diisobutyl fumarate, diisobutyl maleate, caproic triglyceride, 2-ethylhexyl benzoate, and dipropylene glycol dibenzoate. Among them, preferred from the viewpoint of good compatibility with 2-cyanoacrylic acid ester and of high plasticizing efficiency are tributyl acetyl citrate, dimethyl adipate, dimethyl phthalate, 2-ethylhexyl benzoate, and dipropylene glycol dibenzoate. These plasticizers may be used alone or in combination of two or more thereof. The content of the plasticizers is not particularly limited, however, the range thereof is preferably from 3 to 50 parts by mass, particularly preferably from 10 to 45 parts by mass, and further preferably from 20 to 40 parts by mass provided that the total of 2-cyanoacrylic acid ester and the polymer having a hydrolyzable silyl group is 100 parts by mass, and the first reagent and/or the second reagent only have to previously contain the plasticizer in amounts sufficient to satisfy the above amount when used. So long as the content of the plasticizer is in a range of from 3 to 50 parts by mass, and especially when the copolymer is such containing the poorly soluble segments in a larger quantity, the copolymer can be easily dissolved in 2-cyanoacrylic acid ester, and particularly, the retention rate of the adhesive strength after cold/hot cycle resistance test can be improved.

Further, the thickener includes polymethyl methacrylates, copolymers of methyl methacrylate and an acrylate, copolymers of methyl methacrylate and another methacrylate, acrylic rubbers, polyvinylchloride, polystyrene, cellulose esters, polyalkyl-2-cyanoacrylate, and ethylene-vinyl acetate copolymers. These thickeners may be used alone or in combination of two or more thereof. The content of the thickener is not particularly limited, however, the range thereof is preferably from 2 to 50 parts by mass and more preferably from 3 to 30 parts by mass, provided that the total of the 2-cyanoacrylic acid ester and the polymer having a hydrolyzable silyl group is 100 parts by mass, and the first reagent and/or the second reagent only have to previously contain the plasticizer in amounts sufficient to satisfy the above amount when used.

The curable composition may contain fumed silica. The fumed silica refers to ultrafine anhydrous silica (having a primary particle size of 500 nm or smaller, particularly from 1 to 200 nm). This anhydrous silica is ultrafine anhydrous silica (having a primary particle size of 500 nm or smaller, particularly from 1 to 200 nm) which is obtained by, for example, oxidizing silicon tetrachloride as a starting material in gas phase under a high temperature flame, and includes two types of silica, namely, hydrophilic silica which has highly hydrophilic nature, and hydrophobic silica which has highly hydrophobic nature. Either of the fumed silica is usable, however, preferred is hydrophobic silica from the viewpoint of good dispersibility in 2-cyanoacrylic acid esters. Furthermore, it is preferred that a hydrophilic silica is used in combination when the elastomer component is constituted by a copolymer resulting from a larger amount of monomers capable of forming polymers soluble in 2-cyanoacrylic acid ester, i.e., a copolymer containing a larger amount of the soluble segments (which include segments containing a carboxyl group), while a hydrophobic silica is used in combination when the elastomer component is constituted by a copolymer resulting from a larger amount of monomers capable of forming polymers poorly soluble in 2-cyanoacrylic acid ester, i.e., a copolymer containing a larger amount of the poorly soluble segments. The content of fumed silica is not particularly limited, however, the range thereof is preferably from 1 to 30 parts by mass and more preferably 2 to 20 parts by mass, provided that the total of the 2-cyanoacrylic acid ester and the polymer having a hydrolyzable silyl group is 100 parts by mass, and the first reagent and/or the second reagent only have to previously contain the plasticizer in amounts sufficient to satisfy the above amount when used.

The first and second reagents can be each obtained by methods known in the art using the above respective components. The obtained first and second reagents are preferably mixed together immediately before use. The mixing can be carried out by stirring by a mixer or using a container which can mix the first and second reagents stored in separate cartridges and simultaneously coat the mixture.

The mixing ratio of the first reagent to the second reagent (the first reagent:the second reagent) is possibly in a range from 99:1 to 1:99 in mass ratio, and can be adjusted according to the requirements for curability and physical properties of the harded product and the like. The mixing ratio is in the range of preferably from 90:10 to 30:70 and more preferably from 85:15 to 50:50. When the mixing ratio is within a range from 90:10 to 30:70, flexibility can be imparted to the cured product, and the curable composition with excellent adhesiveness can be obtained. Also, the two-part curable composition of the present invention preferably comprises the first and second reagents in amounts sufficient to perform the mixing in the above mixing ratio. In this case, the amount ratio of the first reagent to the second reagent is in a range preferably from 90:10 to 30:70 and more preferably 85:15 to 50:50 in mass ratio.

EXAMPLES

The present invention is explained in further detail by way of Examples below, but the present invention is not limited thereby. In the description below, parts and percentages are based on mass unless otherwise mentioned.

1. Evaluation Method (1) Molecular Weight

Apparatus: "Alliance 2695" (manufactured by WATERS CORPORATION)
Column: Two columns each of "TSKgel SuperMultiporeHZ-H" and "TSKgel SuperHZ-2500" (manufactured by Tosoh Corporation) were connected.
Column temperature: 40° C.
Mobile phase: Tetrahydrofuran 0.35 ml/min
Detector: RI
The molecular weight measured by GPC was converted to polystyrene-based value.

(2) Adhesion Rate

The adhesion rate was measured at 23° C. under 60% RH, in accordance with JIS K 6861 "Testing methods for α-cyanoacrylate adhesives". The test piece used in the measurement was as follows:
Test piece: ABS resin "GSE(tradename)", manufactured by UMG ABS, LTD.

(3) Evaluation of Cold/Hot Cycle Resistance

An aluminum plate (material designated in JIS A6061P) and a test piece made of ABS resin ("ABS-N-WN" (trade name), manufactured by Shin-Kobe Electric Machinery Co., Ltd.) were bonded together using each of the two-part curable compositions obtained in Examples 1 to 13 and in Comparative Example 3, and were allowed to stand still for curing under a temperature of 23° C. and a humidity of 60% RH for 7 days. Then, tensile shear adhesion strength (which is referred to as initial strength) was measured in accordance to JIS K 6861. Subsequently, using a cold/hot impact testing machine, the test pieces were subjected to the hot/cold cycle in which the test piece was maintained at −40° C. for an hour and then at 80° C. for an hour. After the cycle was repeated ten times, the tensile shear adhesion strength (referred to as post test strength) was then measured in a manner similar to above, and the retention rate was calculated according to the following equation.

Retention rate (%)=(post test strength/initial strength)×100

(4) Warm-Water Resistance

An aluminum plate (material designated in JIS A6061P) and a test piece made of ABS resin ("ABS-N-WN" (trade name), manufactured by Shin-Kobe Electric Machinery Co., Ltd.) were bonded together using each of the two-part curable compositions obtained in Examples 1 to 13 and in Comparative Example 3, and were allowed to stand still for curing under a temperature of 23° C. and a humidity of 60% RH for 7 days. Then, tensile shear adhesion strength (which is referred to as initial strength) was measured in accordance to JIS K 6861. Then, after immersing the test piece in warm water at 60° C. for one week, the tensile shear adhesion strength (referred to as posttest strength) was measured in a manner similar to above, and the retention rate was calculated according to the following equation.

Retention rate (%)=(post test strength/initial strength)×100

(5) Peel Adhesion Test

A 0.1-mm thick aluminum foil (material designated in JIS 1N30) was used as a test piece, and the two-part curable compositions obtained in Examples 1 to 13 and in Comparative Example 3 were each used to bond the test pieces. Then, the test pieces were allowed to stand still for curing under a temperature of 23° C. and a humidity of 60% RH for 7 days, and were subjected to 180° peel test for flexible-to-flexible bonded assemblies (T-peel test) according to JIS K6854-3.

(6) Flexibility of Hardened Product

A 1-mm thick hardened product was prepared, and the universal hardness thereof was measured using a depth sensing indentometer "H100CXYp" (tradename) manufactured by Fischer Technology Inc., under a load of 200 mN and a retention time of 10 seconds.

(7) Pot Life

The first and second reagents were mixed under a temperature of 23° C. and a humidity of 60% RH for one minute, and then a time until the mixture underwent gelation and became unusable was measured.

2. Synthesis of Onium Salt

Synthesis Example 1 (methyltri-n-octylammonium trifluoromethanesulfonate)

In a 50-ml eggplant shape flask were charged 4.041 g (10.00 mmol) of methyltri-n-octylammonium chloride (reagent), 13.2 g (20 mg chemical equivalent) of anion exchange resin (AMBERLITE IRA900A OH AG (trade name), strong base type, manufactured by Organo Corporation), and 25 ml of toluene, and were stirred for 48 hours under room temperature. After filtering off the ion exchange resin, 1.501 g (10.00 mmol) of trifluoromethane sulfonate was dropped into the resulting product under ice cooling. The ice bath was removed, and additional stirring was continued for 12 hours under room temperature. Then, after rinsing three times with 25 ml of ion-exchange water, the resulting product was dried on anhydrous sodium sulfate and condensed under reduced pressure. The thus-obtained residue was dissolved in 25 ml of methanol to filter off the insoluble matter. The solvent was distilled away under reduced pressure to obtain 5.022 g of pale yellow semisolid (Onium salt A).

Synthesis Example 2 (4-methyl-1-octylpyridinium bromide)

In a 30-ml eggplant shape flask were charged 9.313 g (0.100 mol) of 4-methylpyridine (reagent), 19.312 g (0.100 mol) of octylbromide (reagent) and 10 ml of acetonitrile, and were stirred for 24 hours at 80° C. The solvent was distilled away under reduced pressure, and dried to obtain 26.311 g of 4-methyl-1-octylpyridinium bromide as a colorless liquid.

Synthesis Example 3 (4-methyl-1-octylpyridinium bis(fluorosulfonylimde))

In a 20-ml eggplant shape flask were charged 2.863 g (10.00 mmol) of 4-methyl-1-octylpyridinium bromide obtained in Synthesis Examples 2 and 5 ml of ion-exchanged water. An aqueous solution of 5.313 g (10.00 mmol) of bis(fluorosulfonylimide) potassium (manufactured by Mitsubishi Materials Corporation) in 10 ml of ion-exchanged water was added thereto, and was stirred for 24 hours under room temperature. The lower layer was separated, washed with 5 ml of ion-exchanged water five times, and then was dried under reduced pressure at 60° C. to obtain 2.744 g of a colorless liquid (onium salt B).

Synthesis Example 4 (benzyltributylammonium bis(fluorosulfonylimide))

Synthesis was made in the same manner as in Synthesis Example 3 except using 3.564 g of benzyltributylammonium bromide (reagent) instead of 4-methyl-1-octylpyridinium bromide, to obtain 3.151 g of a colorless liquid (onium salt C).

3. Production of Two-Part Curable Composition

Example 1

To 100 parts by mass of ethyl 2-cyanoacrylate, were blended 20 ppm of sulfur dioxide, 1000 ppm of hydroquinone, and 1000 ppm of pyrogaroll. Then, 20 parts of an elastomer (ethylene/methyl acrylate copolymer, "Vamac G" (trade name) manufactured by DuPont,) shown in Table 1 was dissolved therein to obtain the first reagent. To 50 parts by mass of the polymer having hydrolyzable silyl groups ("Silyl SAT200" (trade name) manufactured by Kaneka Corporation) to which 1.5 parts of vinyltrimethoxysilane ("A-171" (trade name) manufactured by Momentive Performance Materials Inc.) was previously added, 0.25 part of tetra-n-butyltitanate (ORGATIX TA-21 (tradename) manufactured by Matsumoto Fine Chemical Co., Ltd.) as the curing catalyst for the above polymer was added to obtain the second reagent.

The first and second reagents were mixed in a ratio of 70:30 just before use, and stirred for one minite under room temperature. Various evaluations were conducted using this mixed solution. The results are shown in Table 2.

The curing catalysts for the polymer having a hydrolyzable silyl group (trade name) shown in Table 1 mean the following compounds:
ORGATIX TA-21: tetra-n-butyltitanate
ORGATIX TC-750: titanium ethylacetoacetate
ORGATIX TA-60: di-t-amyldiisopropyltitanate
ORGATIX ZC-150: zirconium tetraacetylacetonate
ORGATIX TA-10: tetraisopropyltitanate

TABLE 1

| | First reagent | | | Second reagent | | | |
|---|---|---|---|---|---|---|---|
| | | Elastomer | | Polymer having a hydrolyzable silyl group | | Curing catalyst for the polymer having a hydrolyzable silyl group | |
| Ex. | 2-cyanoacrylic acid ester | Type | Content (parts by mass) | Type | Content (parts by mass) | Type | Content (parts by mass) |
| 1 | Ethyl 2-cyanoacrylate | Vamac G | 20 | Silyl SAT200 | 50 | ORGATIX TA-21 | Matsumoto Fine Chemical Co., Ltd. | 0.25 |
| 2 | Ethyl 2-cyanoacrylate | Vamac Ultra LT | 20 | Silyl SAT200 | 50 | ORGATIX TC-750 | Matsumoto Fine Chemical Co., Ltd. | 0.5 |
| 3 | Ethyl 2-cyanoacrylate | Vamac Ultra LT | 20 | Silyl SAT200 | 50 | ORGATIX TA-60 | Matsumoto Fine Chemical Co., Ltd. | 0.25 |
| 4 | Ethyl 2-cyanoacrylate | Vamac G | 20 | Silyl SAT200 | 30 | ORGATIX TA-60 | Matsumoto Fine Chemical Co., Ltd. | 0.25 |
| 5 | Ethyl 2-cyanoacrylate | Vamac Ultra LT | 20 | Silyl SAX580 | 20 | ORGATIX ZC-150 | Matsumoto Fine Chemical Co., Ltd. | 0.25 |
| 6 | Ethyl 2-cyanoacrylate | Vamac Ultra LT | 20 | Silyl MA440 | 40 | ORGATIX TC-750 | Matsumoto Fine Chemical Co., Ltd. | 0.25 |
| 7 | Ethyl 2-cyanoacrylate | Vamac G | 30 | Silyl SAT200 Silyl SAT115 | 20 10 | ORGATIX TA-21 | Matsumoto Fine Chemical Co., Ltd. | 0.1 |
| 8 | Ethyl 2-cyanoacrylate | Vamac G | 15 | Silyl SAT200 | 40 | ORGATIX TA-21 | Matsumoto Fine Chemical Co., Ltd. | 0.1 |
| 9 | Ethyl 2-cyanoacrylate 70 parts Isobutyl 2-cyanoacrylate 30 parts | Vamac Ultra LT | 30 | Silyl SAT200 | 20 | ORGATIX TA-10 | Matsumoto Fine Chemical Co., Ltd. | 0.05 |
| 10 | Ethyl 2-cyanoacrylate | Vamac G | 20 | Silyl SAT200 | 50 | ORGATIX TA-60 | Matsumoto Fine Chemical Co., Ltd. | 0.25 |
| 11 | Ethyl 2-cyanoacrylate | Vamac Ultra LT | 20 | Silyl SAT200 | 20 | ORGATIX TA-60 | Matsumoto Fine Chemical Co., Ltd. | 0.25 |
| 12 | Ethyl 2-cyanoacrylate | Vamac G | 20 | Silyl SAT200 | 50 | Methane Sulfonate | KISHIDA CHEMICAL Co., Ltd | 0.02 |
| 13 | Ethyl 2-cyanoacrylate | Vamac Ultra LT | 20 | Silyl SAT200 | 30 | ORGATIX TA-21 | Matsumoto Fine Chemical Co., Ltd. | 0.2 |

TABLE 1-continued

| | | Second reagent Curing accelerator of 2-cyanoacrylic acid ester | |
|---|---|---|---|
| Ex. | Type | | Content (parts by mass) |
| 1 | None | | — |
| 2 | None | | — |
| 3 | methyltri-n-octylammonium trifluoromethane sulfonate | Onium salt A | 2.50 |
| 4 | methyltri-n-octylammonium trifluoromethane sulfonate | Onium salt A | 1.25 |
| 5 | methyltri-n-octylammonium trifluoromethane sulfonate | Onium salt A | 0.05 |
| 6 | 15-crown-5 | "Crown Ether O-15", Nippon Soda Co., Ltd. | 1.00 |
| 7 | 18-crown-6 | "Crown Ether O-18", Nippon Soda Co., Ltd. | 0.05 |
| 8 | methyltri-n-octylammonium bis(trifluoromethane-sulfonyl) imide | Reagent, Tokyo Chemical Industry Co., Ltd. | 1.62 |
| 9 | 4-methyl-1-octylpyridinium bis(fluorosulfonyl)imide | Onium salt B | 0.25 |
| 10 | methyltri-n-octylammonium chloride | Reagent, Sigma-Aldrich Co. LLC. | 0.01 |
| 11 | tetra-n-butylammonium sulfate salt | Reagent, KISHIDA CHEMICAL Co., Ltd. | 0.05 |
| 12 | methyltri-n-octylammonium trifluoromethanesulfonate | Onium salt A | 2.50 |
| 13 | benzyltributylammonium bis(fluorosulfonyl)imide | Onium salt C | 0.25 |

TABLE 2

| | | | Resistance to cold/hot cycles | | | Warm water resistance | | | | | Pot life after mixing (min.) |
|---|---|---|---|---|---|---|---|---|---|---|---|
| | | Adhesion rate (seconds) | Initial strength (N/mm²) | Post test strength (N/mm²) | Retention rate (%) | Initial strength (N/mm²) | Post test strength (N/mm²) | Retention rate (%) | Peel adhesion strength (N/cm) | Universal hardness (N/mm²) | |
| Example | 1 | 120 | 3.3 | 2.5 | 76 | 5.3 | 3.1 | 59 | 3.5 | 2.3 | 60 |
| | 2 | 120 | 2.9 | 2.4 | 83 | 4.9 | 3.1 | 64 | 3.8 | 1.3 | 45 |
| | 3 | 45 | 6.5 | 6.3 | 97 | 12.2 | 8.5 | 70 | 7.5 | 2.3 | 20 |
| | 4 | 45 | 6.8 | 6.7 | 99 | 12.1 | 8.3 | 69 | 6.1 | 4.7 | 30 |
| | 5 | 90 | 4.1 | 3.3 | 80 | 5.8 | 4.0 | 69 | 3.7 | 3.4 | 60 |
| | 6 | 30 | 5.6 | 5.3 | 95 | 9.5 | 6.3 | 66 | 4.7 | 5.6 | 30 |
| | 7 | 60 | 3.8 | 3.6 | 96 | 5.5 | 3.7 | 67 | 4.1 | 2.8 | 30 |
| | 8 | 60 | 4.5 | 4.2 | 93 | 8.6 | 6.1 | 70 | 4.5 | 2.7 | 60 |
| | 9 | 90 | 4.2 | 3.8 | 90 | 8.7 | 5.2 | 60 | 9.9 | 5.1 | 60 |
| | 10 | 90 | 3.8 | 3.7 | 98 | 6.8 | 4.1 | 61 | 4.3 | 3.7 | 10 |
| | 11 | 90 | 6.7 | 6.2 | 92 | 6.4 | 4 | 62 | 4.7 | 5 | 20 |
| | 12 | 45 | 3.9 | 3.6 | 92 | 6.1 | 4.1 | 67 | 4.3 | 2.8 | 90 |
| | 13 | 30 | 5.3 | 5.3 | 100 | 9.3 | 6.0 | 65 | 4.5 | 4.1 | 60 |
| | 14 | 45 | 3.6 | 3.3 | 92 | 6.0 | 4.2 | 70 | 4.1 | 2.7 | 90 |
| Comp. Example | 1 | | | | | Gelation | | | | | |
| | 2 | | | | | Gelation | | | | | |
| | 3 | >300 | 1.8 | 1.2 | 67 | 1.9 | 0.7 | 37 | 0.5 | 0.6 | >120 |

Example 2

A two-part curable composition was prepared in the same manner as in Example 1, except that the type of the elastomer and the type of the curing catalyst for the polymer having a hydrolyzable silyl group were changed as shown in Table 1.

The copolymer composition and the average molecular weight of the elastomers used are shown in Table 3. In Table 3, "E" denotes ethylene, "MA" denotes methyl acrylate, "AA" denotes acrylic acid, and "BA" denotes butyl acrylate. In addition, details of the polymers having a hydrolyzable silyl group used were shown in Table 4.

TABLE 3

| Vamac series | Copolymer composition (mol %) | | | | Average Molecular Weight (×10⁴) | |
|---|---|---|---|---|---|---|
| | E | MA | AA | BA | Mn | Mw |
| G | 70.0 | 29.2 | 0.8 | 0 | 3.3 | 26.2 |
| Ultra LT | 64.6 | 14.5 | 2.0 | 19.0 | 8.1 | 27.5 |

TABLE 4

| Silyl series | Main chain chemical structure | Hydrolyzable silyl group | Number Average Molecular weight |
|---|---|---|---|
| SAT200 | polypropylene glycol | methyldimethoxysilyl group | 12700 |
| SAT115 | polypropylene glycol | methyldimethoxysilyl group | 4300 |
| SAX580 | polypropylene glycol | trimethoxysilyl group | 32400 |
| MA440 | polypropylene glycol/acrylic mixture | methyldimethoxysilyl group | 10100 |

Example 3

To 100 parts by mass of ethyl 2-cyanoacrylate were added 20 ppm of sulfur dioxide, 1000 ppm of hydroquinone, and 1000 ppm of pyrogallol. In this liquid, 20 parts by mass of an elastomer (ethylene/methyl acrylate copolymer, "Vamac Ultra LT" (trade name) manufactured by DuPont) given in Table 1 was dissolved to prepare the first reagent. In addition, to 50 parts by mass of the polymer having a hydrolyzable silyl group ("Silyl SAT200" (trade name) manufactured by Kaneka Corporation) to which 1.5 parts of vinyltrimethoxysilane ("A-171" (trade name) manufactured by Momentive Performance Materials Inc.) was previously added, were added t-amyltitanate ("ORGATIX TA-60" (trade name) manufactured by Matsumoto Fine Chemical Co., Ltd.) as a curing catalyst for the above polymer and the onium salt A prepared in Synthesis Example 1 as a curing accelerator for 2-cyanoacrylic acid ester in the amounts shown in Table 1 so as to prepare the second reagent.

The first and second reagents were mixed just before use in a ratio of 70:30, and stirred for an hour under room temperature to obtain the mixed liquid.

Examples 4 to 13

Two part curable compositions were prepared in the same manner as in Example 3, except that the 2-cyanoacrylate, the polymer having a hydrolyzable silyl group, the curing catalyst for the above polymer and the curing accelerator for 2-cyanoacrylic acid ester were changed as shown in Table 1.

Example 14

To 100 parts by mass of ethyl 2-cyanoacrylate were added 20 ppm of sulfur dioxide, 1000 ppm of hydroquinone, and 1000 ppm of pyrogallol. In this liquid, 20 parts by mass of an elastomer (ethylene/methyl acrylate copolymer, "Vamac G" (trade name) manufactured by DuPont) and 0.02 part by mass of methanesulfonate (manufactured by KISHIDA CHEMICAL Co., Ltd.) as a curing catalyst for the polymer having a hydrolyzable group were dissolved to prepare the first reagent. In addition, to 30 parts by mass of a polymer having a hydrolyzable silyl group ("Silyl SAT200" (trade name) manufactured by Kaneka Corporation) to which 1.5 part of vinyltrimethoxysilane ("A-171" (trade name) manufactured by Momentive Performance Materials Inc.) was previously added, was added 2.50 parts by mass of the onium salt A as a curing catalyst for 2-cyanoacrylic acid ester to prepare the second reagent. The first and second reagents were mixed just before use in a ratio of 70:30, and stirred for an hour under room temperature. Various evaluations were made using the obtained mixed liquid.

Comparative Example 1

Production was conducted in the same manner as in Example 1, except that no elastomer was added as in the composition shown in Table 5. However, it was impossible to mix 2-cyanoacrylate contained in the first reagent with the polymer having a hydrolyzable silyl group contained in the second reagent, and they remained separated into two layers. Also, they generated heat a few minutes later to cause gelation, and thus no evaluation was possible.

Comparative Example 2

Production was conducted in the same manner as in Example 1, except that the polymer having a hydrolyzable silyl group was not added as in the composition shown in Table 5. However, when the second reagent was added to the first reagent, gelation immediately occurred around the added second reagent, and thus no evaluation was possible.

Comparative Example 3

A two-part curable composition was prepared and evaluated in the same manner as in Example 1, except that no curing catalyst for the polymer having a hydrolyzable silyl group was added as in the composition shown in Table 5. The results are given in Table 2.

TABLE 5

| | First reagent | | | Second reagent | | | |
|---|---|---|---|---|---|---|---|
| | | | | Polymer having a hydrolyzable silyl group | | Curing catalyst for the polymer having a hydrolyzable silyl group | |
| Comparative Example | 2-cyanoacrylic acid ester | Elastomer Type | Content (parts by mass) | Type | Content (parts by mass) | Type | Content (parts by mass) |
| 1 | Ethyl 2-cyanoacrylate | — | — | Silyl SAT 200 | 50 | ORGATIX TA-21 Matsumoto Fine Chemical Co., Ltd. | 0.25 |

TABLE 5-continued

| | First reagent | | | Second reagent | | | |
| | | | | Polymer having a hydrolyzable silyl group | | Curing catalyst for the polymer having a hydrolyzable silyl group | |
| Comparative Example | 2-cyanoacrylic acid ester | Elastomer Type | Content (parts by mass) | Type | Content (parts by mass) | Type | Content (parts by mass) |
|---|---|---|---|---|---|---|---|
| 2 | Ethyl 2-cyanoacrylate | Vamac G | 20 | — | — | ORGATIX TA-21 Matsumoto Fine Chemical Co., Ltd. | 0.25 |
| 3 | Ethyl 2-cyanoacrylate | Vamac G | 20 | Silyl SAT 200 | 50 | — | — |

INDUSTRIAL APPLICABILITY

The two-part curable composition of the present invention exhibits goog curability, and the resulting cured product has flexibility. Moreover, since it is excellent in adhesion durability such as cold/hot cycle resistance and warm water resistance, it can be utilized in a wide range of fields such as household and industrial applications.

The invention claimed is:

1. A two-part curable composition comprising a first reagent containing at least a Component (a) shown below and a second reagent containing at least a Component (c) shown below, in which Components (b) and (d) shown below are each contained in at least one of the first and second reagents, wherein
the contents of the Component (b) contained in the first and second reagents being 5-50 parts by mass relative to 100 parts of the Component (a) in terms of the Component (b) contained in the first reagent and being 5-50 parts by mass relative to 100 parts by mass of the Component (c) in terms of the Component (b) contained in the second reagent, and
the total amount of the Component (d) contained in the first and second reagents being 0.0005-10 parts by mass relative to 100 parts by mass of the Component (c),
Component (a): a 2-cyanoacrylic acid ester;
Component (b): an elastomer;
Component (c): a polymer having a hydrolyzable silyl group; and
Component (d): a curing catalyst for the polymer (c).

2. The two-part curable composition according to claim 1, wherein the elastomer is a copolymer made from a monomer capable of forming a polymer poorly soluble to 2-cyanoacrylic acid ester and a monomer capable of forming a polymer soluble to 2-cyanoacrylic acid ester.

3. The two-part curable composition according to claim 2, wherein the monomer capable of forming a polymer poorly soluble to 2-cyanoacrylic acid ester is at least one selected from ethylene, propylene, isoprene, butadiene, chloroplene, 1-hexene and cyclopentene, and the monomer capable of forming a polymer soluble to 2-cyanoacrylic acid ester is at least one selected from acrylic acid esters, methacrylic acid esters, vinylchloride, vinylacetate, vinylether, styrene and acrylonitrile.

4. The two-part curable composition according to claim 1, wherein the elastomer is a copolymer made from a monomer capable of forming a polymer poorly soluble to 2-cyanoacrylic acid ester, a monomer capable of forming a polymer soluble to 2-cyanoacrylic acid ester, and a monomer containing a carboxyl group.

5. The two-part curable composition according to claim 4, wherein the monomer capable of forming a polymer poorly soluble to 2-cyanoacrylic acid ester is at least one selected from ethylene, propylene, isoprene, butadiene, chloroplene, 1-hexene and cyclopentene, and the monomer capable of forming a polymer soluble to 2-cyanoacrylic acid ester is at least one selected from acrylic acid esters, methacrylic acid esters, vinylchloride, vinylacetate, vinylether, styrene and acrylonitrile.

6. The two-part curable composition according to claim 1, wherein the main chain chemical structure of the polymer having a hydrolyzable silyl group is at least one polymer selected from the group consisting of oxyalkylene polymer, vinyl polymer, polyester polymer, polyurethane polymer, and polycarbonate polymer.

7. The two-part curable composition according to claim 6, wherein the two part curable composition further comprises
a curing accelerator for 2-cyanoacrylic acid ester as the component (a) further contained in at least one of the first and second reagents, and wherein
the elastomer is (i) a copolymer made from a monomer capable of forming a polymer poorly soluble to 2-cyanoacrylic acid ester and a monomer capable of forming a polymer soluble to 2-cyanoacrylic acid ester, or (ii) a copolymer made from a monomer capable of forming a polymer poorly soluble to 2-cyanoacrylic acid ester, a monomer capable of forming a polymer soluble to 2-cyanoacrylic acid ester, and a monomer containing a carboxyl group, and
the curing catalyst is (i) an acid having a pKa of 4 or lower at 25° C. or (ii) a compound having a metal element and an organic group bonded to the metal element via oxygen.

8. The two-part curable composition according to claim 1, wherein the polymer having a hydrolyzable silyl group has a number average molecular weight of from 500 to 50,000.

9. The two-part curable composition according to claim 1, wherein the curing catalyst is a compound having a metal element and an organic group bonded to the metal element via oxygen.

10. The two-part curable composition according to claim 9, wherein the metal element of the curing catalyst is at least one selected from the group consisting of titanium, zirconium, hafnium, tin, aluminium and zinc.

11. The two-part curable composition according to claim 9, wherein the organic group of the curing catalyst is at least one selected from the group consisting of alkoxy group, acetylacetone, acetoacetic ester, carboxyl group, and phenoxy group.

12. The two-part curable composition according to claim 1, wherein the curing catalyst is an acid having a pKa of 4 or lower at 25° C.

13. The two-part curable composition according to claim 12, wherein the acid is at least one selected from the group consisting of sulfonic acid, phosphoric acid, phosphoric acid monoesters, phosphoric acid diesters, phosphorous acid, and phosphorous acid esters.

14. The two-part curable composition according to claim 1, wherein a curing accelerator for 2-cyanoacrylic acid ester as the component (a) is further contained in at least one of the first and second reagents.

15. The two-part curable composition according to claim 14, in which the curing accelerator is an onium salt represented by the following general formula (1):

wherein $C^+$ is an onium cation, and $A^-$ is one selected from the anion group consisting of:

a hydrogen sulfate anion, a hydrogen sulfite anion, a sulfonate anion represented by $R^1SO_3^-$ wherein $R^1$ is a group selected from the group consisting of an alkyl group, cycloalkyl group, vinyl group, aryl group, alkenyl group, alkynyl group and aralkyl group, or a halogen atom, and the aforementioned group may be substituted with a substituent, a sulfate anion represented by $R^2OSO_3^-$ wherein $R^2$ is a group selected from the group consisting of an alkyl group, cycloalkyl group, vinyl group, aryl group, alkenyl group, alkynyl group and aralkyl group, and the aforementioned group may be substituted with a substituent, a bis(substituted sulfonyl)imide anion represented by $(R^3SO_2)(R^4SO_2)N^-$ wherein $R^3$ and $R^4$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, an imide anion represented by $(R^5CO)(R^6CO)N^-$ wherein $R^5$ and $R^6$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, an sulfonylimide anion represented by $(R^7SO_2)(R^8CO)N^-$ wherein $R^7$ and $R^8$, which may be the same or different, are groups selected from the group consisting of an alkyl group, cycloalkyl group, vinyl group, aryl group, alkenyl group, alkynyl group and aralkyl group, or halogen atoms, and the aforementioned groups may be substituted with a substituent, a perhalogenated lewis acid anion, a tetrafluoroborate anion, a hexafluorophosphate anion, a halogen anion, a nitrate anion, $CN^-$, $SCN^-$, $OCN^-$, $N(CN)_2^-$, a phosphoric acid anion and a phosphate anion represented by $(R^9O)_aPO_{4-a}^{(3-a)-}$ wherein $R^9$ is a group selected from the group consisting of an alkyl group, cycloalkyl group, vinyl group, aryl group, alkenyl group, alkynyl group and aralkyl group wherein the aforementioned group may be substituted with a substituent, a is an integer of 0-2, and $R^9$ may be the same or different in case there are a plurality of $R^9$, a phosphonic acid anion and a phosphonate anion represented by $R_{10}(R^{11}O)_bPO_{3-b}^{(2-b)-}$ wherein $R^{10}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{11}$ is a group selected from the group consisting of an alkyl group, cycloalkyl group, vinyl group, aryl group, alkenyl group, alkynyl group and aralkyl group wherein the aforementioned group may be substituted with a substituent, and b is 0 or 1, a phosphinic acid anion represented by $R^{12}{}_2PO_2^-$ wherein $R^{12}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{12}$ may be the same or different, a phosphorous acid and a phosphite anion represented by $(R^{13}O)_cPO_{3-c}^{(3-c)-}$ wherein $R^{13}$ is a group selected from the group consisting of an alkyl group, cycloalkyl group, vinyl group, aryl group, alkenyl group, alkynyl group and aralkyl group wherein the aforementioned group may be substituted with a substituent, c is an integer of 0-2, and $R^{13}$ may be the same or different in case there are a plurality of $R^{13}$, a phosphonous acid anion and a phosphonite anion represented by $R^{14}(R^{15}O)_dPO_{2-d}^{(2-d)-}$ wherein $R^{14}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{15}$ is a group selected from the group consisting of an alkyl group, cycloalkyl group, vinyl group, aryl group, alkenyl group, alkynyl group and aralkyl group wherein the aforementioned group may be substituted with a substituent, and d is 0 or 1, a phosphinic acid anion represented by $R^{16}{}_2PO^-$ wherein $R^{16}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{16}$ may be the same or different, a carboxylic acid anion represented by $R^{17}CO_2^-$ wherein $R^{17}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, a carbonate anion represented by $CO_3^{2-}$, a boric acid and a borate anion represented by $(R^{18}O)_fBO_{3-f}^{(3-f)-}$ wherein $R^{18}$ is a group selected from the group consisting of an alkyl group, cycloalkyl group, vinyl group, aryl group, alkenyl group, alkynyl group and aralkyl group wherein the aforementioned group may be substituted with a substituent, f is an integer of 0-2, and $R^{18}$ may be the same or different in case there are a plurality of $R^{18}$, a boronic acid and a boronate anion represented by $R_{19}(R^{20}O)_gBO_{2-g}^{(2-g)-}$ wherein $R^{19}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{20}$ is a group selected from the group consisting of an alkyl group, cycloalkyl group, vinyl group, aryl group, alkenyl group, alkynyl group and aralkyl group wherein the aforementioned group may be substituted with a substituent, and g is 0 or 1, a borinic acid anion represented by $R^{21}{}_2BO^-$ wherein $R^{21}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, and $R^{21}$ may be the same or different, a silicic acid and a silicate ester anion represented by $(R^{22}O)_hSiO_{4-h}{}^{(4-h)-}$ wherein $R^{22}$ is a hydrogen or a group selected from the group consisting of an alkyl group, cycloalkyl group, vinyl group, aryl group, alkenyl group, alkynyl group and aralkyl group wherein the aforementioned group may be substituted with a substituent, h is an integer of 0-3, and $R^{22}$ may be the same or different in case there are a plurality of $R^{22}$, and a silicic acid and an anion of an organic silicon compound represented by $R^{23}{}_i(R^{24}O)_jSiO_{4-i-j}{}^{(4-i-j)-}$ wherein $R^{23}$ and $R^{24}$ are a hydrogen or a group selected from the group consisting of an alkyl group, cycloalkyl group, vinyl group, aryl group, alkenyl group, alkynyl group and aralkyl group wherein the aforementioned group may be substituted with a substituent, $R^{23}$ and $R^{24}$ may be the same or different, i is an integer of 1-3, j is an integer of 0-2, i+j is an integer of 1-3, and $R^{23}$ and $R^{24}$ may be the same or different in case there are a plurality of $R^{23}$ or $R^{24}$.

16. The two-part curable composition according to claim 15, wherein the anion $A^-$ of the onium salt is at least one selected from the group consisting of a hydrogen sulfate anion; a hydrogen sulfite anion; a sulfonate anion represented by $R^1SO_3^-$ wherein $R^1$ represents an alkyl group, perfluoroalkyl group, cycloalkyl group, vinyl group, aryl group, perfluoroaryl group, alkenyl group, alkynyl group, aralkyl group or halogen atom; a bis(substituted sulfonyl) imide anion represented by $(R^3SO_2)(R^4SO_2)N^-$ wherein $R^3$ and $R^4$ represent an alkyl group, perfluoroalkyl group, cycloalkyl group, vinyl group, aryl group, perfluoroaryl group, alkenyl group, alkynyl group, aralkyl group or halogen atom; a tetrafluoroborate anion; a hexafluorophosphate anion; a halogen anion; and a nitrate anion.

* * * * *